United States Patent
Kim et al.

(10) Patent No.: US 12,526,719 B2
(45) Date of Patent: *Jan. 13, 2026

(54) METHOD AND APPARATUS FOR CARRIER AGGREGATION COMMUNICATION IN WIRELESS COMMUNICATION SYSTEM

(71) Applicant: Samsung Electronics Co., Ltd., Suwon-si (KR)

(72) Inventors: Myoungseok Kim, Seongnam-si (KR); Hoon Huh, Yongin-si (KR); Heekwang Lee, Suwon-si (KR); Ilwon Kwon, Seoul (KR); Jaeho Jeon, Seongnam-si (KR); Jungah Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

This patent is subject to a terminal disclaimer.

(21) Appl. No.: 16/901,742

(22) Filed: Jun. 15, 2020

(65) Prior Publication Data

US 2020/0314725 A1    Oct. 1, 2020

Related U.S. Application Data

(63) Continuation of application No. 15/129,241, filed as application No. PCT/KR2015/003000 on Mar. 26, 2015, now Pat. No. 10,687,267.

(Continued)

(30) Foreign Application Priority Data

May 2, 2014    (KR) .................. 10-2014-0053680

(51) Int. Cl.
*H04W 36/38*    (2009.01)
*H04L 5/14*    (2006.01)
(Continued)

(52) U.S. Cl.
CPC ............... *H04W 36/38* (2013.01); *H04L 5/14* (2013.01); *H04W 16/32* (2013.01);
(Continued)

(58) Field of Classification Search
CPC ... H04W 36/38; H04W 36/026; H04W 76/15; H04W 16/32; H04W 72/042;
(Continued)

(56) References Cited

U.S. PATENT DOCUMENTS 9,467,912 B2    10/2016    Zhang et al.
2011/0134774 A1    6/2011    Pelletier et al.
(Continued)

FOREIGN PATENT DOCUMENTS

EP    2835918 A1    2/2015
EP    2 897 398 A1    7/2015
(Continued)

OTHER PUBLICATIONS

NEC Group Deployment scenarios and requirements for TDD-FDD joint , 3GPP TSG-RAN WG1#74, R1-133343, Aug. 23, 2018.
(Continued)

*Primary Examiner* — Yaotang Wang
(74) *Attorney, Agent, or Firm* — Jefferson IP Law, LLP

(57) ABSTRACT

One embodiment of the present invention provides an apparatus comprising a transceiving unit and a control unit, and a communication method using the same, wherein the transceiving unit is configured to perform communication with at least one network node in a macro cell, the macro cell comprising at least one small cell and communicating in an FDD mode, and wherein the control unit is configured to control the small cell to communicate in a TDD mode, generate control information for preventing the occurrence of handover when a terminal moves between the small cells (Continued)

within the macro cell, and perform control to transmit the control information to the terminal.

17 Claims, 17 Drawing Sheets

Related U.S. Application Data

(60) Provisional application No. 61/983,712, filed on Apr. 24, 2014, provisional application No. 61/978,494, filed on Apr. 11, 2014, provisional application No. 61/970,528, filed on Mar. 26, 2014.

(51) Int. Cl.
*H04W 16/32* (2009.01)
*H04W 36/00* (2009.01)
*H04W 36/02* (2009.01)
*H04W 36/04* (2009.01)
*H04W 72/23* (2023.01)
*H04W 76/15* (2018.01)

(52) U.S. Cl.
CPC ... *H04W 36/00695* (2023.05); *H04W 36/026* (2013.01); *H04W 72/23* (2023.01); *H04W 76/15* (2018.02); *H04W 36/04* (2013.01)

(58) Field of Classification Search
CPC .... H04W 36/04; H04W 36/0069; H04L 5/14; H04J 11/0069; H04J 2211/001; H04B 7/2612
See application file for complete search history.

(56) References Cited

U.S. PATENT DOCUMENTS

| | | |
|---|---|---|
| 2012/0263045 A1 | 10/2012 | Fauconnier et al. |
| 2013/0148535 A1 | 6/2013 | Baghel et al. |
| 2013/0237208 A1 | 9/2013 | Vujcic |
| 2013/0252613 A1 | 9/2013 | Charbit et al. |
| 2013/0272187 A1 | 10/2013 | Malladi et al. |
| 2014/0004863 A1 | 1/2014 | Zhang et al. |
| 2014/0010125 A1 | 1/2014 | Tillman et al. |
| 2014/0092823 A1* | 4/2014 | Song ............... H04L 1/0077 370/329 |
| 2014/0269632 A1* | 9/2014 | Blankenship ......... H04W 76/15 370/336 |
| 2015/0055521 A1 | 2/2015 | Seo et al. |
| 2015/0133128 A1* | 5/2015 | Xiong ............... H04W 36/22 455/444 |
| 2015/0181498 A1 | 6/2015 | Li et al. |
| 2015/0223058 A1* | 8/2015 | Yang ............... H04W 36/0058 455/411 |
| 2015/0304913 A1 | 10/2015 | Uusitalo et al. |
| 2015/0305000 A1 | 10/2015 | Nguyen et al. |
| 2015/0334734 A1* | 11/2015 | Park ............... H04L 1/1825 370/329 |
| 2015/0341829 A1* | 11/2015 | Futaki ............... H04W 36/28 370/331 |
| 2016/0316457 A1 | 10/2016 | Lan et al. |
| 2016/0374119 A1* | 12/2016 | Choi ............... H04W 76/10 |
| 2017/0064541 A1* | 3/2017 | Uchino ............... H04L 5/1469 |

FOREIGN PATENT DOCUMENTS

| | | |
|---|---|---|
| WO | 2011-063244 A2 | 5/2011 |
| WO | 2013-151396 A1 | 10/2013 |
| WO | 2013-158363 A2 | 10/2013 |
| WO | 2014/037158 A1 | 3/2014 |
| WO | 2014/040518 A1 | 3/2014 |

OTHER PUBLICATIONS

3GPP TSG RAN WG1 Meeting #74, R1-133323, Barcelona, Spain, Aug. 23, 2013.

NSN et al: Handover procedure in case of bearer served by MeNB and SeNB (3C), 3GPP Draft; R3-132102 Handover Procedure for 3C, 3rd Generation Partnership Project (3GPP), Mobile Competence Centre ; 650, Route Des Lucioles ; F-06921 S0phia-Antip0lis Cedex; France, vol. RAN WG3, No. San Francisco, USA; Nov. 13, 2013, XP050738362.

NTT Docomo et al: Introduction of Dual Connectivity, 3GPP Draft; R2-140906_Introduction of Dual Connectivity_V8_Clean, 3rd Generation Partnership Project (3GPP), Mobile Competence Centre ; 650, Route Des Lucioles ; F-06921 Sophia-Anti Polis Cedex; France, vol. RAN WG2, No. Prague, Czech Republic; Feb. 22, 2014, XP050770936.

Sharp, 'Deployment scenarios and requirements for TDD-FDD CA', R1-133232, 3GPP TSG RAN WG1 Meeting #74, Barcelona, Spain, Aug. 10, 2013.

Intel Corporation, 'Scenarios and benefits of dual connectivity', R2-130570, 3GPP TSG RAN WG2 Meeting #81, St. Julian's, Malta, Jan. 19, 2013.

Ericsson: "CP and UP separation", 3GPP Draft; R2-133425—CP and UP Separation, 3rd Generation Partnership Project (3GPP), Mobile Competence Centre ; 650, Route Des Lucioles ; F-06921 Sophia-Antipolis Cedex ; France vol. RAN WG2, No. Ljubljana, Slovenia; Oct. 7, 2013-Oct. 11, 2013 Sep. 28, 2013 (Sep. 28, 2013), XP050719180, Sep. 28, 2013.

LG Electronics Inc: "Connectivity Models for Small Cell Enhancement", 3GPP Draft; R2-130314 SC Connectivity Models_R1,3rd, Generation Partnership Project (3GPP), Mobile Competence Centre ; 650, Route Des Lucioles ; F-06921, Sophia-Antipolis Cedex ; France vol. RAN WG2, No. St. Julian; Jan. 28, 2013-Feb. 1, 2013 Jan. 18, 2013(Jan. 18, 2013), XP050668059, Jan. 18, 2013.

European Search Report dated Oct. 29, 2021, issued in European Application No. 21184413.9.

Extended European Search Report dated Mar. 15, 2023, issued in European Patent Application No. 22213052.8.

* cited by examiner

… (1)

METHOD AND APPARATUS FOR CARRIER AGGREGATION COMMUNICATION IN WIRELESS COMMUNICATION SYSTEM

CROSS-REFERENCE TO RELATED APPLICATION(S)

This application is a continuation application of prior application Ser. No. 15/129,241, filed on Sep. 26, 2016, which has issued as U.S. Pat. No. 10,687,267 on Jun. 16, 2020, and which is a U.S. National Stage application under 35 U.S.C. § 371 of an International application number PCT/KR2015/003000, filed on Mar. 26, 2015, which is based on and claims priority under 35 U.S.C. § 119(e) of a U.S. Provisional application Ser. No. 61/970,528, filed on Mar. 26, 2014, and which is based on and claims priority under 35 U.S.C. § 119(e) of a U.S. Provisional application Ser. No. 61/978,494, filed on Apr. 11, 2014, and which is based on and claims priority under 35 U.S.C. § 119(e) of a U.S. Provisional application Ser. No. 61/983,712, filed on Apr. 24, 2014, and which was based on and claimed priority under 35 U.S.C § 119(a) of a Korean patent application number 10-2014-0053680, filed on May 2, 2014, in the Korean Intellectual Property Office, the disclosure of each of which is incorporated by reference herein in its entirety.

TECHNICAL FIELD

The present invention relates to a carrier aggregation communication method in a wireless communication system and an apparatus thereof. The present invention relates to a method and apparatus for improving mobility and managing interruptions based on the state of a cell in a carrier aggregation system.

BACKGROUND ART

Generally, a mobile communication system is developed for the purpose of providing communication by securing the mobility of a user. With the support from the dramatic development of technologies, the mobile communication system has reached a level of providing a high-speed data communication service as well as voice communication. Recently, the standardization of a long term evolution (LTE)/LTE-advanced (LTE-A) system in 3rd generation partnership project (3GPP) is in the process, which is one of the next generation mobile communication systems. LTE is a technology of implementing high speed packet based communication with a transmission rate of up to about 100 Mbps. As the types of services using a wireless mobile communication system have been diversified, there has been a desire for a new technology for efficiently supporting newly introduced services. Accordingly, new methods and technologies for improving the quality of communication based on an LTE/LTE-A system have been studied.

Technical Problem

Therefore, the present invention has been made in view of the above-mentioned problems, and an aspect of the present invention is to provide a method and apparatus for efficiently improving the quality of communication in a wireless communication system. Another aspect of the present invention is to provide a method and apparatus for improving the quality of communication based on the state of a cell.

Solution to Problem

In accordance with an aspect of the present invention, there is provided a macro cell apparatus including at least one small cell, the apparatus including: a transceiving unit configured to communicate with at least one network node; and a controller configured to perform controlling to: set the macro cell to an FDD mode; set the small cell to a TDD mode; generate control information to prevent a handover from occurring when a user equipment (UE) moves between small cells in the macro cell; and transmit the control information to the UE.

In accordance with another aspect of the present invention, there is provided a carrier aggregation configuration method of a macro cell including at least one small cell, the method including: setting the macro cell to an FDD mode; setting the small cell to a TDD mode; generating control information to prevent a handover from occurring when a UE moves between small cells in the macro cell; and transmitting the control information to the UE.

In accordance with another aspect of the present invention, there is provided a UE apparatus that communicates with a macro cell including at least one small cell, the apparatus including: a transceiving unit configured to communicate with at least one network node; and a controller configured to: receive control information from the macro cell that is set to an FDD mode, and based on the control information, perform setting to prevent a handover from occurring when the UE moves between the small cells which are set to TDD.

In accordance with another aspect of the present invention, there is provided a carrier aggregation configuration method of a UE that communicates with a macro cell including at least one small cell, the method including: receiving control information from the macro cell that is set to an FDD mode; and performing setting, based on the control information, to prevent a handover from occurring when the UE moves between small cells that are set to TDD.

In accordance with another aspect of the present invention, there is provided a carrier aggregation communication method of a macro cell (Primary cell (PCell)) in a wireless communication system, the method including: receiving, from a user equipment (UE), measurement information associated with a secondary cell (SCell); and determining the transmission of a user plane from the macro cell, based on the measurement information.

In accordance with another aspect of the present invention, there is provided a macro cell (primary cell (PCell)) apparatus for carrier aggregation communication in a wireless communication system, the apparatus including: a transceiving unit configured to communicate with at least one network node; and a controller configured to perform controlling to receive measurement information associated with a small cell (secondary cell(SCell)) from the UE, and to determine, based on the measurement information, the transmission of a user plane from the macro cell.

In accordance with another aspect of the present invention, there is provided a carrier aggregation communication method of a UE in a wireless communication system, the method including: transmitting measurement information associated with a small cell (secondary cell (SCell)) to a macro cell (primary cell (PCell)); receiving an SCell configuration message from the macro cell, based on the measurement information; and receiving a user plane from the small cell as opposed to receiving a user plane from the macro cell when the small cell is in an SCell activation state.

In accordance with another aspect of the present invention, there is provided a UE apparatus for carrier aggregation communication in a wireless communication system, the apparatus including: a transceiving unit configured to communicate with at least one network node; and a controller configured to perform controlling to: transmit measurement information associated with a small cell (secondary cell (SCell)) to a macro cell (primary cell (PCell)), receive an Scell configuration message from the macro cell based on the measurement information, and receive a user plane from the small cell as opposed to receiving a user plane from the macro cell when the small cell is in an SCell activation state.

In accordance with another aspect of the present invention, there is provided a macro cell apparatus including at least one small cell, the apparatus including: a transceiving unit configured to communicate with at least one network node; and a controller configured to perform controlling to: set the macro cell to an FDD mode; set the small cell to a TDD mode; generate control information to perform setting to prevent a handover from occurring when a UE moves between the small cells in the macro cell; separate a control plane and a user plane into the macro cell and the small cell based on the control information; and determine whether to perform the transmission of a user plane from the macro cell based on state information of the small cell.

In accordance with another aspect of the present invention, there is provided a carrier aggregation communication method of a macro cell including at least one small cell, the method including: setting the macro cell to an FDD mode; setting the small cell to a TDD mode; generating control information to perform setting to prevent a handover from occurring when a UE moves between the small cells in the macro cell; separating a control plane and a user plane into the macro cell and the small cell based on the control information; and determining whether to perform the transmission of a user plane from the macro cell based on state information of the small cell.

In accordance with another aspect of the present invention, there is provided a UE apparatus that communicates with a macro cell including at least one small cell, the apparatus including: a transceiving unit configured to communicate with at least one network node; and a controller configured to perform controlling to: receive control information for performing setting to prevent a handover from occurring when the UE moves between the small cells that communicate based on TDD; separate a control plane and a user plane into the macro cell and the small cell based on the control information; and receive a control plane or a user plane from the macro eNB, wherein the reception of the user plane from the macro eNB is determined based on Scell activation state information associated with the small cell.

In accordance with another aspect of the present invention, there is provided a carrier aggregation communication method of a UE that communicates with a macro cell including at least one small cell, the method including: receiving control information for performing setting to prevent a handover from occurring when the UE moves between small cells that communicate based on TDD; separating a control plane and a user plane into the macro cell and the small cell based on the control information; and receiving a control plane or a user plane from the macro eNB, wherein the reception of a user plane from the macro eNB is determined based on SCell activation state information associated with the small cell.

Advantageous Effects of Invention

According to an embodiment of the present invention, there is provided a method and apparatus for efficiently improving the quality of communication in a wireless communication system. According to an embodiment of the present invention, there is provided a method and apparatus for improving the quality of communication based on the state of a cell.

Also, according to an embodiment of the present invention, high-speed switching is possible without a handover during the movement between small cells. Also, according to an embodiment of the present invention, interruption may be reduced when a small cell is added, a small cell is changed, or a small cell is released.

Also, according to an embodiment of the present invention, a user plane and a data plane of a macro cell and a small cell are separately operated, and thus, the load of the macro cell may be decreased and a radio resource throughput may be improved.

MODE FOR THE INVENTION

Figure 1:
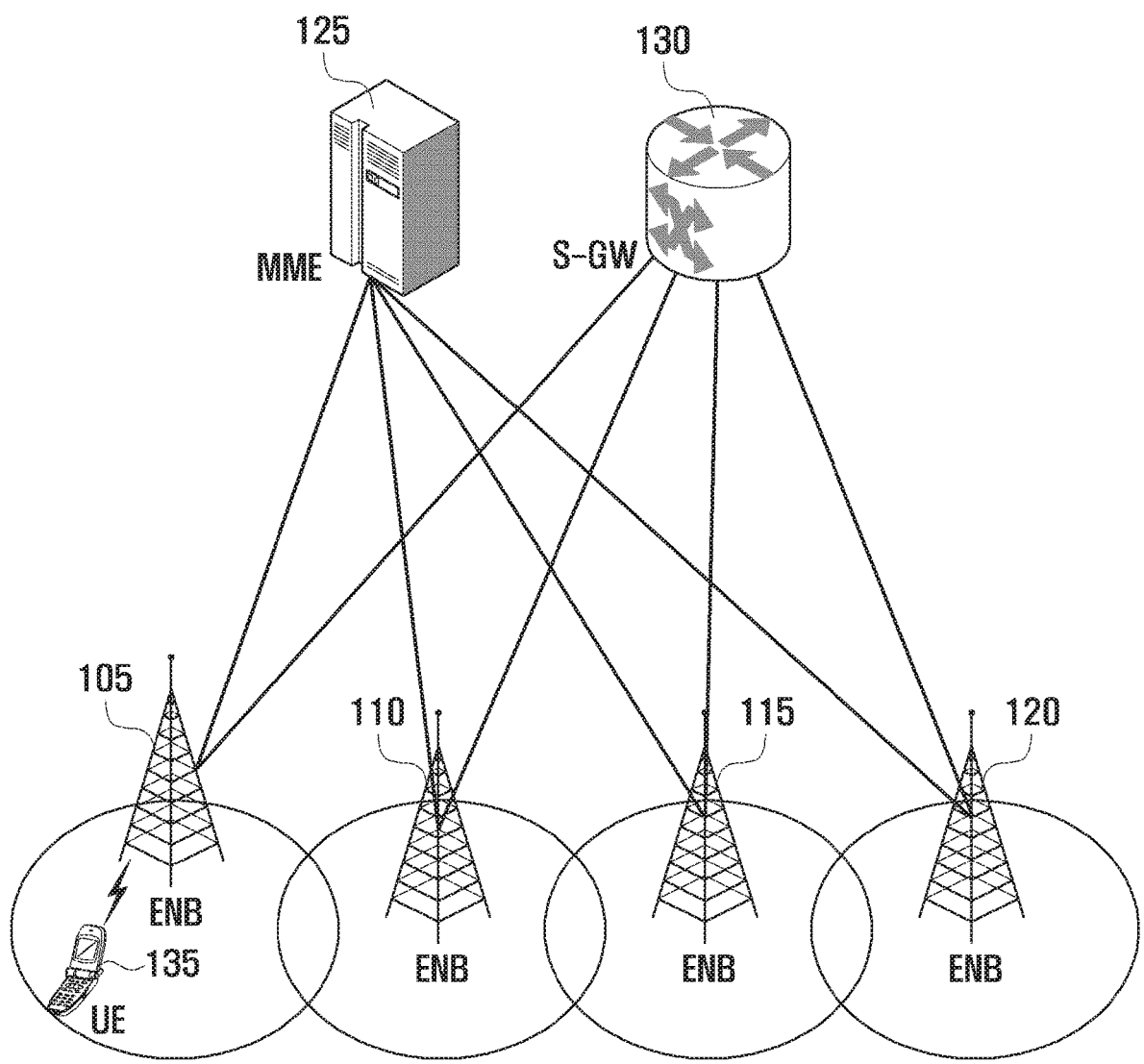
FIG. 1 is a diagram illustrating a structure of an LTE system according to the present invention.

Hereinafter, various embodiments will be described with reference to the accompanying drawings. It should be noted that the same elements will be designated by the same reference numerals although they are shown in different drawings. Further, a detailed description of a known function and configuration which may make the subject matter of the present invention unclear will be omitted. Hereinafter, it should be noted that only the descriptions will be provided that may help understanding the operations provided in association with the various embodiments of the present invention, and other descriptions will be omitted to avoid making the subject matter of the present invention rather unclear.

In the following embodiments of the present invention, it is assumed that a mobile communication network supports carrier aggregation (CA). In the embodiments of the present invention, it is assumed that a user equipment (UE) supports CA. In this instance, CA supported to a UE may support CA of each of FDD/FDD, TDD/TDD, TDD/FDD, and FDD/TDD. Also, in the case of CA, a macro cell is set as a primary cell (PCell) and a small cell is set as a secondary cell (SCell).

When a primary cell (PCell) of a mobile communication network that supports CA is operated as FDD, and a secondary cell (SCell) is operated as TDD, a TDD cell coverage is determined as described below, which is an advantage. However, the embodiments of the present invention to be described below do not always assume that a PCell is set to FDD and an SCell is set to TDD, and may be applied to any combinations.

In the embodiments of the present invention, a control plane refers to a signal associated with control information. The term, 'plane' may be interchangeably used with the term, such as a plane, a dimension, or the like. Hereinafter, the embodiments of the present invention will be described by assuming that the terms are interchangeably used.

Control information may include scheduling information, Ack/Nack information, connection management information, and mobility management information. A user plane is a signal associated with data information, excluding control information. The data information may include VOLTE information, and Internet data service information.

In the embodiments of the present invention, a split of a control plane and a user plane may be referred to as a C-U split. The C-U split performs separation so that a control plane is performed in only a macro cell, and a user plane is performed in a small cell, a macro cell, or a small cell/macro cell. In this instance, the control plane for a data plane service of a small cell may be transmitted through the macro cell. Therefore, in the C-U split, a UE receives a control signal from the macro cell when the UE moves between the small cells in the macro cell. A control signal for the inter-cell movement may be also received through the macro cell.

Hereinafter, for ease of description, a first embodiment and a second embodiment will be described separately. However, the first embodiment and the second embodiment relate to cell configuration for improving the efficiency of communication in CA of a macro eNB and a small eNB, a C-U split, and the improvement of radio resource processing based on a small cell environment, and it is apparent that the combination of the embodiments are possible.

FIG. 1 is a diagram illustrating a structure of an LTE system according to the present invention.

Referring to FIG. 1, as illustrated in the drawings, a radio access network of an LTE system is formed of a next generation base station (an evolved node B (eNB), a Node B, or a base station) 105, 110, 115, and 120, a mobility management entity (MME) 125, and a serving-gateway (S-GW) 130. A user equipment (UE) (or a terminal) 135 may access an external network through the eNB 105 to 120, and the S-GW 130.

In FIG. 1, the eNB 105 to 120 correspond to an existing node B in a UMTS system. The eNB is connected with the UE 135 through a wireless channel, and performs a more complicated role than the conventional node B. In the LTE system, real-time services, such as a voice over IP (VoIP) through an Internet protocol, and all user traffic are provided through a shared channel. Accordingly, there is a desire for a device that performs scheduling by collecting state information, such as the buffer state of UEs, an available transmission power state, a channel state, and the like, and the eNB 105 to 120 may be in charge of it. One ENB generally controls a plurality of cells. In order to implement a transmission rate of 100 Mbps, the LTE system uses an Orthogonal Frequency Division Multiplexing (OFDM) as a wireless access technology in a bandwidth of 20 MHz. Also, an adaptive modulation & coding (AMC) scheme that determines a modulation scheme and a channel coding rate may be applied based on the channel state of a UE. The S-GW 130 is a device for providing a data bearer, and generates or removes a data bearer under the control of the MME 125. The MME is a device that is in charge of various control functions in addition to a mobility management function associated with a UE, and may be connected to a plurality of eNBs.

Figure 2:
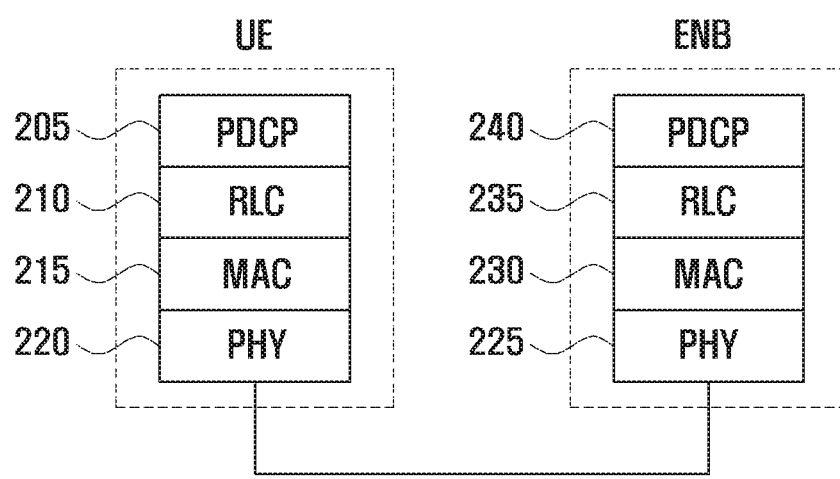
FIG. 2 is a diagram illustrating a structure of a wireless protocol in an LTE system according to the present invention.

FIG. 2 is a view illustrating a structure of a wireless protocol in the LTE system according to the present invention.

Referring to FIG. 2, the UE and the eNB includes a packet data convergence protocol (PDCP) 205 or 240, a radio link control (RLC) 210 or 235, a medium access control (MAC) 215 or 230, respectively, as the wireless protocol of the LTE system. A packet data convergence protocol (PDCP) 205 and 240 is in charge of an IP header compression/decompression operation or the like, and a radio link control (RLC) 210 and 235 reconfigure a PDCP packet data unit (PDU) to have an appropriate size, and performs an ARQ operation. The MAC 215 or 230 is connected with various RLC layer devices configured for a single UE, and performs multiplexing of RLC PDUs to a MAC PDU and demultiplexing of the RLC PDUs from the MAC PDU. The PHY layers 220 and 225 perform an operation of channel-coding and modulating higher layer data to generate an OFDM symbol and transmitting the OFDM symbol through a radio channel, or demodulating and channel-decoding the OFDM symbol received through the radio channel and transmitting the demodulated and channel-decoded OFDM symbol to the higher layer.

Figure 3:
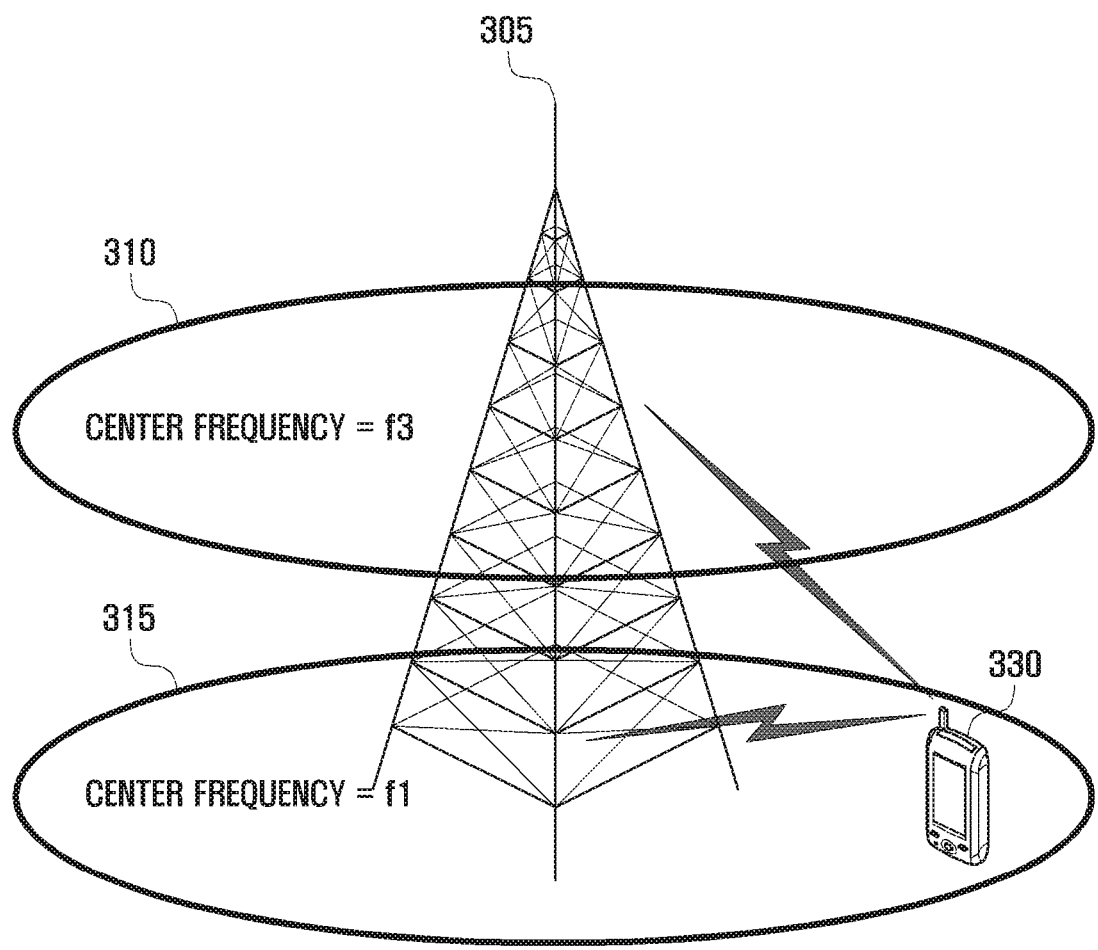
FIG. 3 is a diagram illustrating carrier aggregation from the perspective of a user equipment (UE)

FIG. 3 is a diagram illustrating carrier aggregation from the perspective of a UE.

Referring to FIG. 3, one eNB generally transmits and receives multiple carriers through different frequency bandwidths. For example, when a carrier 315 of which the central frequency is f1 and a carrier 310 of which the central frequency is f3 are transmitted from an eNB 305, conventionally, a single UE transmits/receives data using one out of the two carriers. However, a UE that has carrier aggregation capability may simultaneously transmit/receive data to/from multiple carriers. The eNB 305 may allocate a larger number of carriers to the UE 330 that has the carrier aggregation capability according to circumstances, so as to improve the transmission rate of the UE 330.

When a single cell is configured with a single forward direction carrier and a single reverse direction carrier which are transmitted and received in a single eNB, from the conventional view, carrier aggregation may be understood as a technology in which a UE simultaneously transmits/receives data through multiple cells. Through the above, a maximum transmission speed may increase in proportion to the number of carriers aggregated.

The carrier aggregation technology breaks the conventional scheme of using a single carrier between a UE and an eNB in the conventional communication, and uses a single main carrier and a plurality of sub-carriers, thereby dramatically increasing an amount of transmission in proportion to the number of sub-carriers. In LTE, a main carrier is referred to as a primary cell (PCell) and a sub-carrier is referred to as a secondary cell (SCell).

To use the carrier aggregation technology, additional complexity may be generated when a PCell controls an SCell. That is, the PCell needs to determine which SCells are to be used and to not be used. When the matters are determined, the PCell needs to control various matters associated with whether to use or not use a corresponding SCell. A detailed method of activating an SCell may be needed. That is, a detailed operation executed when an SCell activation/deactivation command is received from an eNB, needs to be specified.

A method of operating a network by separating a control plane and a user plane according to the first embodiment of the present invention will be described with reference to FIGS. 4 to 9. The first embodiments of the present invention describe a method of operating a macro cell based on a frequency division duplexer (FDD), and operating a small cell based on a time division duplexer (TDD) in a mobile communication network that supports carrier aggregation.

FDD and TDD have the following pros and cons. FDD is appropriate for a service, such as a voice service, which generates symmetric traffic. TDD is appropriate for a bursty or asymmetric traffic service, such as Internet or data. TDD may more efficiently utilize the spectrum of a band. FDD may not be used in an environment that has a bandwidth that is not enough for a service provider to provide a guardband required between a transmission channel and a reception channel. TDD is more flexible than FDD when the TDD enables uplink and downlink to satisfy dynamically set requirements in association with the requirements from a user. Also, FDD is a mainly low frequency band, and thus, FDD may be disadvantageous from the perspective of a data rate, but may be advantageous from the perspective of a coverage. TDD is a mainly high frequency band, and thus, may be disadvantageous from the perspective of coverage but may be advantageous from a data rate.

As described above, TDD and FDD have pros and cons. Therefore, when CA between TDD carriers and FDD carriers is used, operators may be able to use resources of all available spectrums and the flexibility of a mobile communication system and a high performance gain may be obtained. That is, FDD and TDD spectrums may be more flexibly utilized, and thus, lack of resource may be alleviated. Also, the combination of FDD and TDD may be an effective scheme of supporting asymmetric traffic.

As described above, operating an FDD cell and a TDD cell together may provide the above described benefits, and thus, the first embodiment provides a method of effectively operating CA using FDD and TDD. Particularly, the first embodiment describes a method of improving mobility by separating a control plane and a user plane, and further describes a method of improving a throughput.

In an embodiment of the present invention, when a UE moves between small cells by separating a control plane and a user plane, cell switching may be performed without performing a handover. Through the above, the mobility of a UE and the mobility of a network may be improved. To this end, a handover will be described first.

Figure 4:
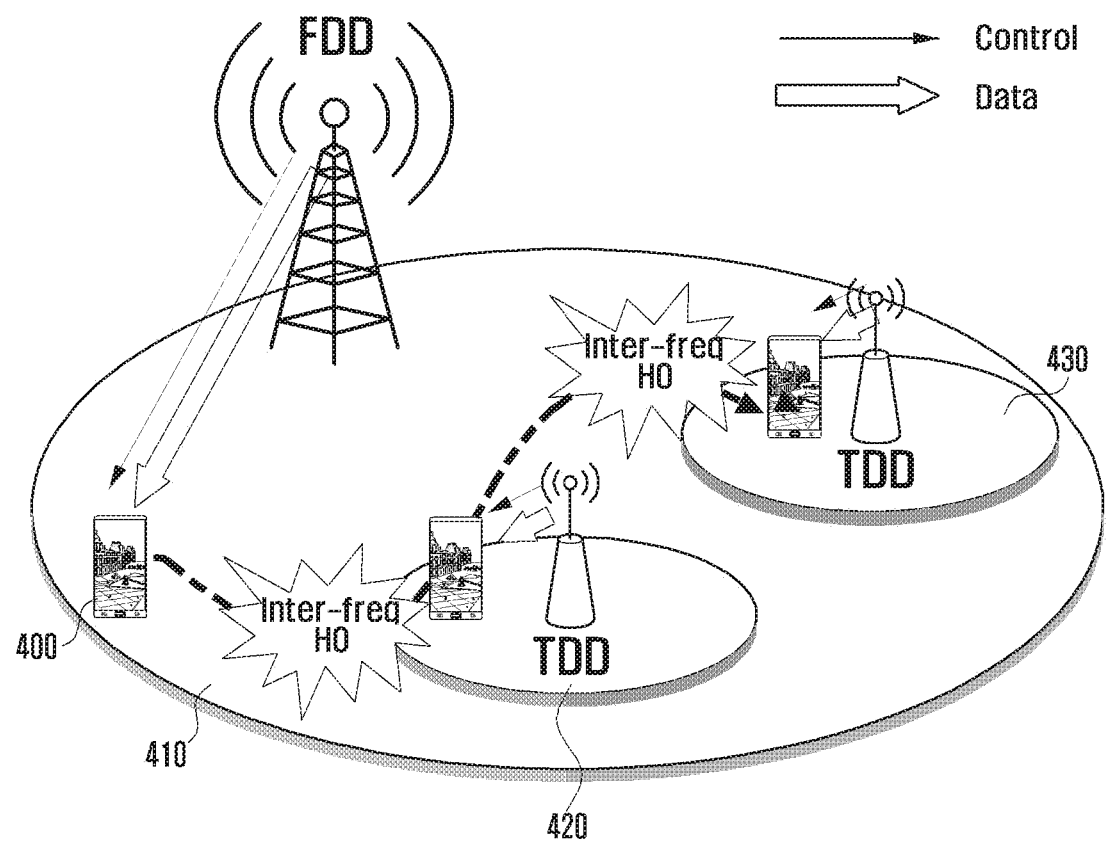
FIG. 4 is a diagram illustrating a handover in a mobile communication system that does not support carrier aggregation (CA)

FIG. 4 is a diagram illustrating a handover in a mobile communication system that supports carrier aggregation (CA) of a macro cell and a small cell.

A handover refers to a communication technology that enables a subscriber to continuously receive a service of an existing region although the subscriber is out of the region of a cell that provides the service of the region where the subscriber is currently located, and moves to a neighbor cell. The handover may automatically switch a current communication channel when the subscriber moves between sectors in the cell that provides the service, or when the subscriber moves from one cell to another cell. For a smooth handover, a handover at a network level of two adjacent regions need to be performed, in addition to a handover at a wireless communication level. In the case of a handover, radio resource control reconfiguration of a higher layer is required, and thus, temporary interruption may occur even when a soft handover is applied.

The type of handover may be classified as an intra-cell handover, an inter-cell handover, and the like based on a scope where a handover occurs.

Intra-cell handover may be referred to as a softer handover that is performed within one cell, which indicates that a UE changes a current channel within a cell coverage where the UE currently exists. Mostly, many signals overlap in a boundary between sectors. A UE that passes through the region performs communication through two sectors, which is referred to as a softer handover. That is, a transmitted/received signal is processed in a single eNB, and thus, this is a handover that performs processing using a single modulator/demodulator as a final modulator/demodulator.

The inter-cell handover generally refers to a soft handover, and is based on a connect-before-break scheme. That is, this indicates that a connection with a new eNB is established before the disconnection from a previous eNB. In this instance, there is a desire for an effective scheme for reducing a handover delay, a cell loss, or the like, which may be caused by the re-establishment of a connection, the release of an existing connection, or the like. The inter-cell handover may indicate a scheme that continues existing communication through a new eNB when a mobile terminal is out of a cell boundary of a service eNB and is incapable of continuing the connection.

Referring to FIG. 4, a mobile communication system includes a macro cell 410 and a plurality of small cells 420 and 430 that are included in the coverage of the macro cell. The coverage of the plurality of small cells may be configured to overlap with each other or may be configured to not overlap to one another. The macro cell 410 may be operated as FDD, and small cells 420 and 430 may be operated as TDD.

A UE 400 may perform communication within the scope of the macro cell 410. Under the assumption that the mobile communication system of FIG. 4 does not support carrier aggregation (CA) of the macro cell 410 and the small cells 420 and 430, when the UE 400 is located outside a small cell coverage within the coverage of the macro cell, the UE 400 may receive a control signal and a data signal from the macro cell 410 eNB. When the UE 400 is located in the coverage of the small cell 420 and 430, the UE may perform an inter-frequency handover to a small cell eNB, and may receive a control signal and a data signal from the small cell eNB. The macro cell 410 and the small cell 420 and 430 may provide the UE with a control region, respectively, and thus, inter-cell UE movement executed between a macro cell and a small cell, a small cell and a small cell, and a small cell and a macro cell may be the inter-cell handover.

As described above, when the handover is performed, temporary signal interruption occurs, and thus, this may be a factor that may hinder the mobility of a network. Therefore, in the case of a movement within a macro cell, there is a desire for a method of improving mobility without performing a handover.

Figure 5:
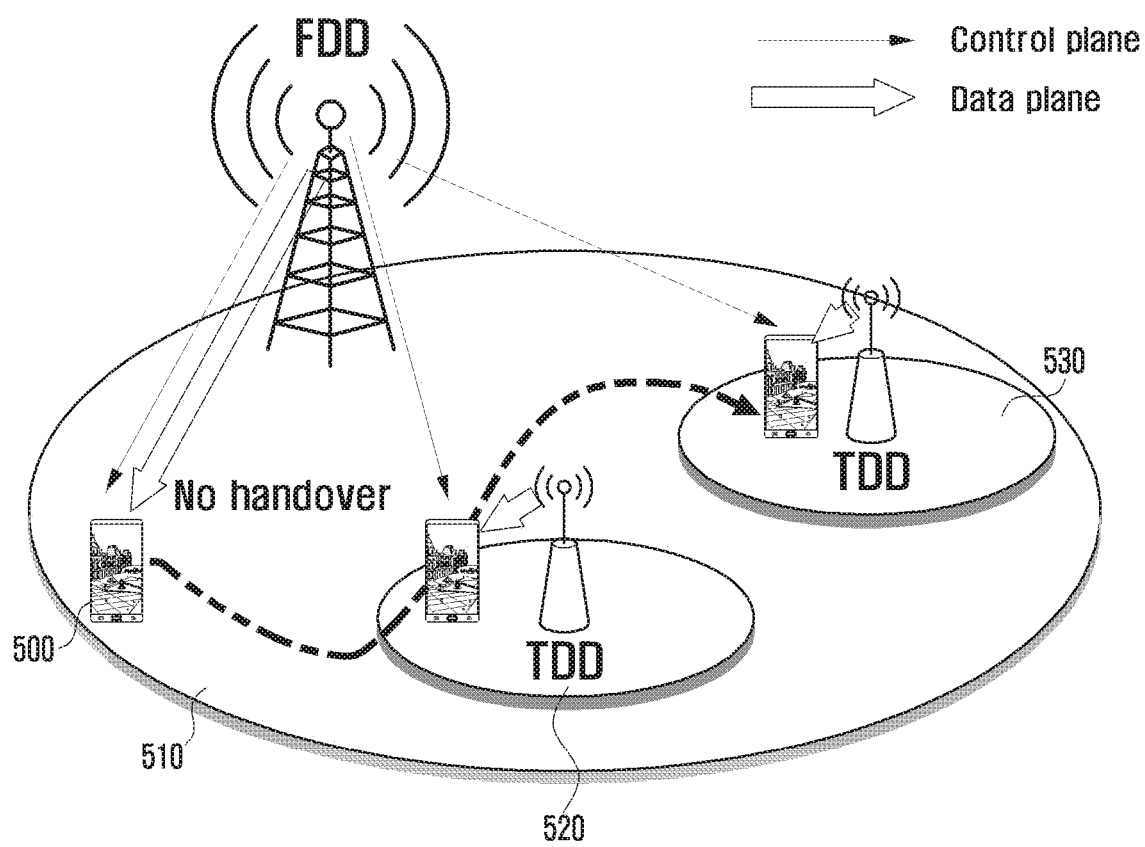
FIG. 5 is a diagram illustrating a split of a control region and a user region according to an embodiment of the present invention.

FIG. 5 is a diagram illustrating a split of a control region and a user region according to an embodiment of the present invention. The configuration of a cell of FIG. 5 is the same as described in FIG. 4. Referring to FIG. 5, it is shown that a control plane and a user plane are separated based on a C-U split. When a UE 500 is outside the coverage of a small cell 520 and 530, the UE 500 may receive a service associated with a control plane and a user plane from a macro cell 510. When the UE moves to the coverage of the small cell 520 and 530, the UE may receive a service from the small cell through CA. In this instance, according to the C-U split, the UE may receive a service associated with only a user plane, from the small cell 520 and 530. When the UE is in the small cell coverage, the UE may or may not receive a service associated with a user plane from a macro eNB. In the case in which the UE receives a service associated with a user region in parallel from the macro eNB and the small cell eNB, when a real-time service, such as VOLTE, is important, it is advantageous when the UE is set to receive a service associated with the user region from the macro cell, and to receive a normal data service using a small cell as a high speed service.

When the network is configured and operated as illustrated in FIG. 5, the system may share all of the advantages of FDD and TDD. That is, FDD-TDD CA may be operated in a manner of performing connection management and mobility management, which corresponds to a control function, in a macro FDD PCell layer, transmitting a PUCCH of a TDD SCell through an uplink of an FDD PCell, and preventing the transmission of a PUSCH of the TDD SCell. That is, the coverage of the TDD SCell may be enlarged by operating the TDD SCell based on a downlink only mode. Accordingly, the off-loading ratio of the TDD SCell may increase and a region that is available for TDD-FDD CA may be expanded, and thus, a downlink throughput is more increased.

The TDD-FDD CA operation scenario as described above may be applied to a HeNet scenario in which an FDD PCell and a TDD SCell are not co-located, in addition to a scenario in which an FDD PCell and a TDD SCell are co-located in a macro or small cell.

Figure 6:
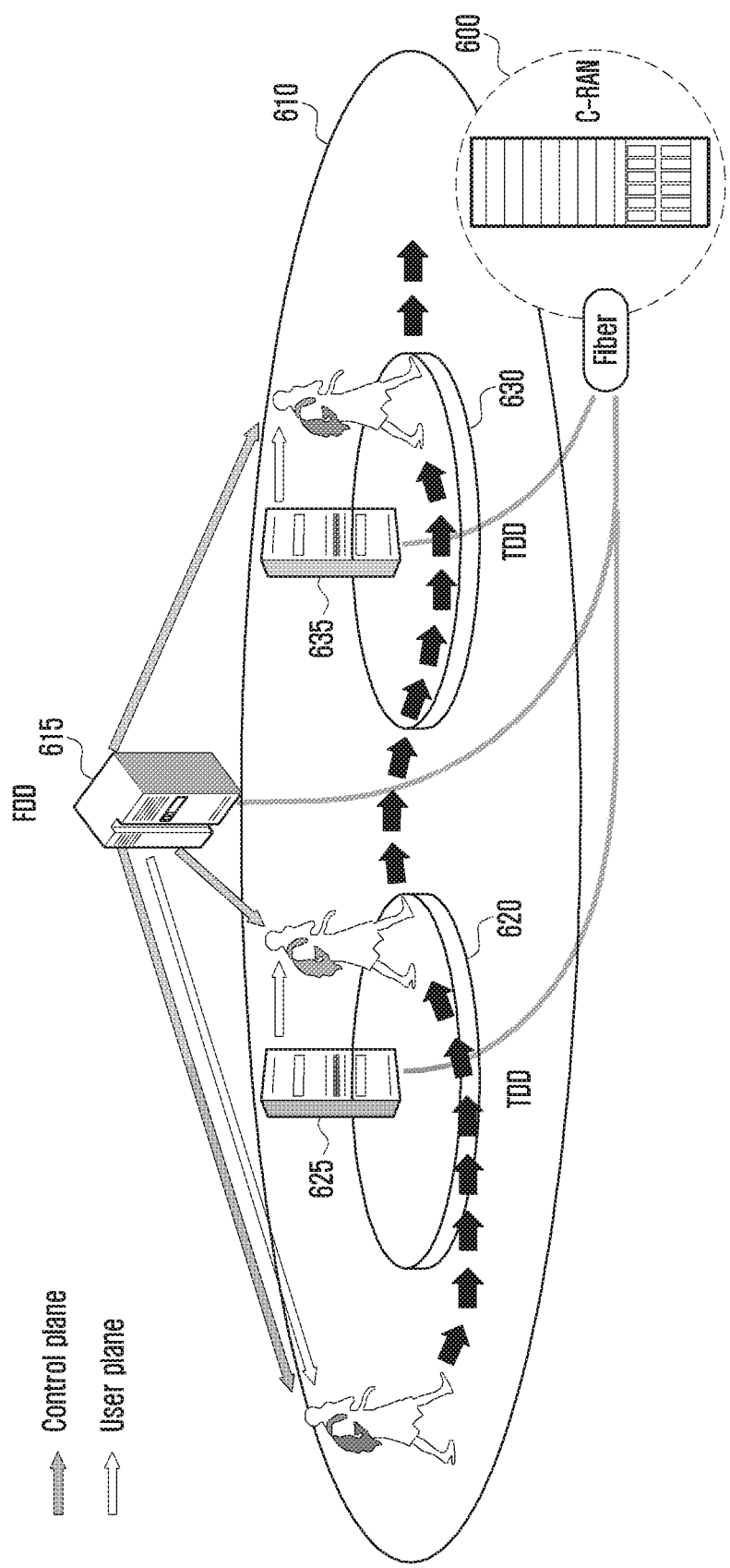
FIG. 6 is a diagram illustrating a network environment according to an embodiment of the present invention.

FIG. 6 is a diagram illustrating a network environment according to an embodiment of the present invention. Referring to FIG. 6, a coordination radio access network (C-RAN) entity 600 exists that manages all of a macro cell 610 and small cells 620 and 630. A macro eNB 615 that manages a macro cell and a small cell eNB 625 and 635 that manage a small cell are connected with the C-RAN 600 over a wired network. The C-RAN indicates a network that is adjusted in real time, and is capable of performing CA, since a scheduler that is capable of scheduling the macro cell and a scheduler that is capable of scheduling the small cell are located in the same eNB.

The C-RAN may receive a measurement report (MR) from the UE, and may determine whether a small cell is capable of providing a service associated with a user plane based thereon. Based on the result, a service may be provided based on a C-U split when the UE is located in a small cell coverage. When the UE is outside the small cell coverage, a service associated with a control plane and a data plane may be provided from the macro eNB.

Figure 7:
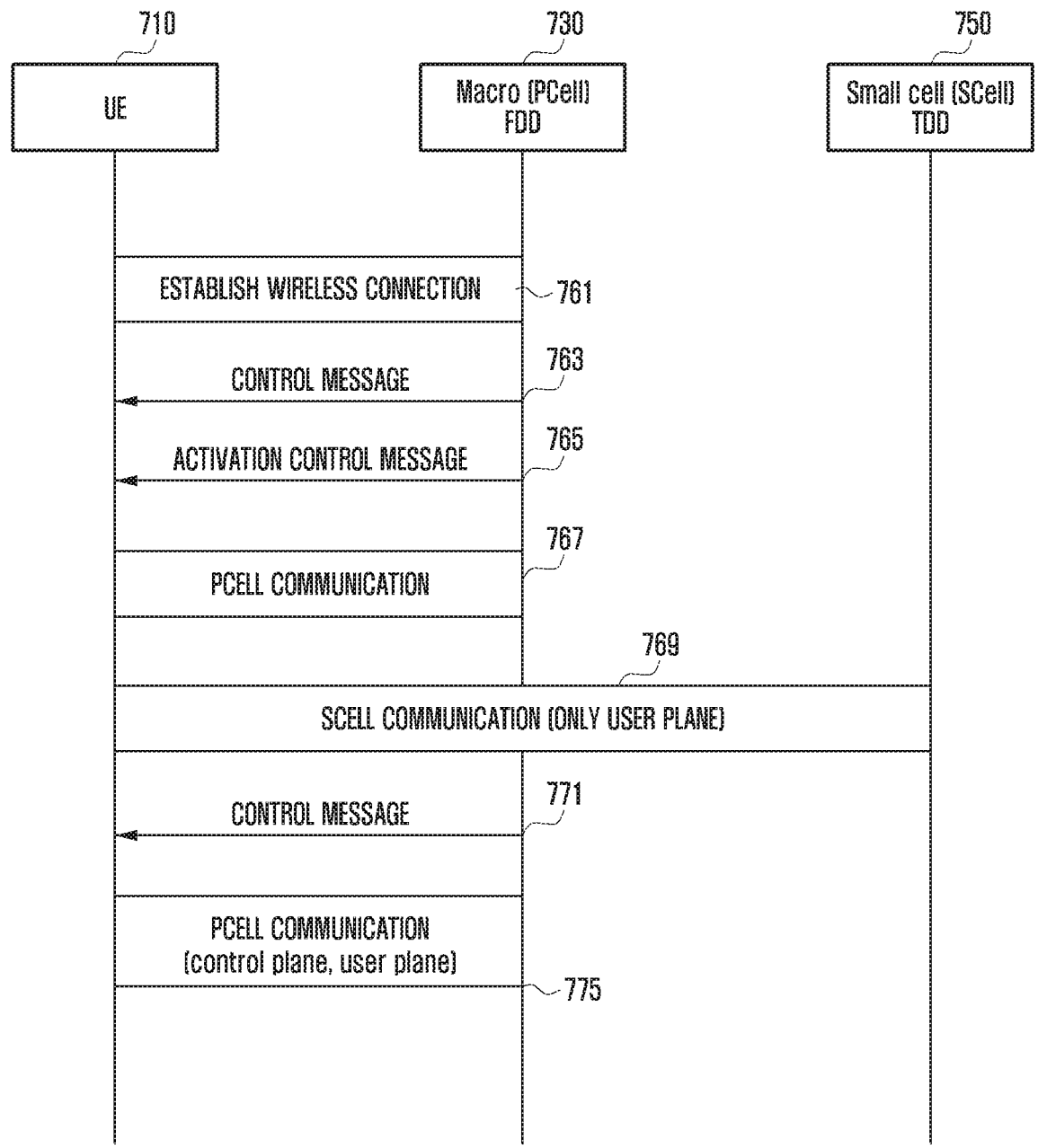
FIG. 7 is a diagram illustrating a network operating method according to a first embodiment of the present invention.

FIG. 7 is a diagram illustrating a network operating method according to a first embodiment of the present invention. Referring to FIG. 7, a network may include a UE 710, a macro cell 730, and a small cell 750 The small cell may be a plurality of small cells.

In operation 761, the UE 710 and the macro cell 730 may establish a wireless connection, and may perform communication. When the UE is located in a macro cell coverage, as opposed to a small cell coverage, the UE may receive a service associated with a control plane and a user plane from the macro cell 730.

In operation 763, the macro cell 730 may transmit a control message to the UE 710. An RRC signaling may be used for the transmission of the control message. The control information may include information indicating the addition of an SCell in association with CA. Alternatively, according to another embodiment of the present invention, a C-U split related control information may be further included in the RRC signaling.

The macro cell 730 may transmit a control message associated with whether to add or release an SCell based on a measurement report received from the UE. The C-U split related control information may be control information indicating that a macro cell (PCell) operated based on FDD needs to provide a service associated with a control plane and a small cell (SCell) operated based on TDD needs to provide a service associated with only a data plane.

In this instance, the control information associated with the small cell (SCell) may be transmitted to the UE 710 through the PCell. That is, the UE 710 may receive a control signal associated with the macro cell and a control signal associated with the small cell through the control plane of the PCell. Indicating that the small cell needs to provide a service associated with only a data plane does not indicate that the macro cell is incapable of providing a service associated with a data plane. Indicating that the small cell needs to provide a service associated with only a data plane indicates that the small cell does not provide a service associated with a control plane.

When the control message includes an SCell-add message, the macro cell 730 may transmit an activation control message to the UE 710 in operation 765. The activation control message may be transmitted in the form of an MAC CE. When the UE receives the activation control message, an SCell corresponding to the message may be activated.

Subsequently, in operations 767 to 769, communication through a C-U split may be performed based on the received control message. That is, connection management, mobility management, and a scheduling related message, which correspond to a control function, may be performed in a macro FDD PCell layer in operation 767. In this instance, a data plane may not exist in the FDD PCell layer. TDD-FDD CA may be operated in a manner of transmitting a PUCCH of a TDD SCell through an FDD PCell Uplink, and preventing the transmission of a PUSCH of a TDD SCell. The TDD SCell operates only a downlink mode in operation S769, and may expand the coverage of the TDD SCell. The communication in operations S767 and 769 corresponds to communication in which C and U are separated.

During the operation of CA of the macro cell 730 and the small cell 750, the UE may be out of a small cell coverage. The macro cell 730 may release a small cell from a secondary cell, based on measurement information received from the UE.

In operation 771, the macro cell 730 may transmit a control message to the UE 710. The control message may include indication information that instructs to release an SCell. The UE may deactivate the SCell based on the corresponding message. The connection between the UE 710 and the small cell 750 may be released.

In operation 775, the UE 710 and the macro cell 730 may perform communication using the PCell. (This is under the assumption that the UE does not enter another small cell coverage after being out of the coverage of the small cell 750. When the UE enters another small cell coverage, it is apparent that the UE is capable of receiving a service associated with a data plane from an SCell through SCell switching or an SCell-add control message.) The small cell 750 terminates the service associated with the data plane.

Figure 8:
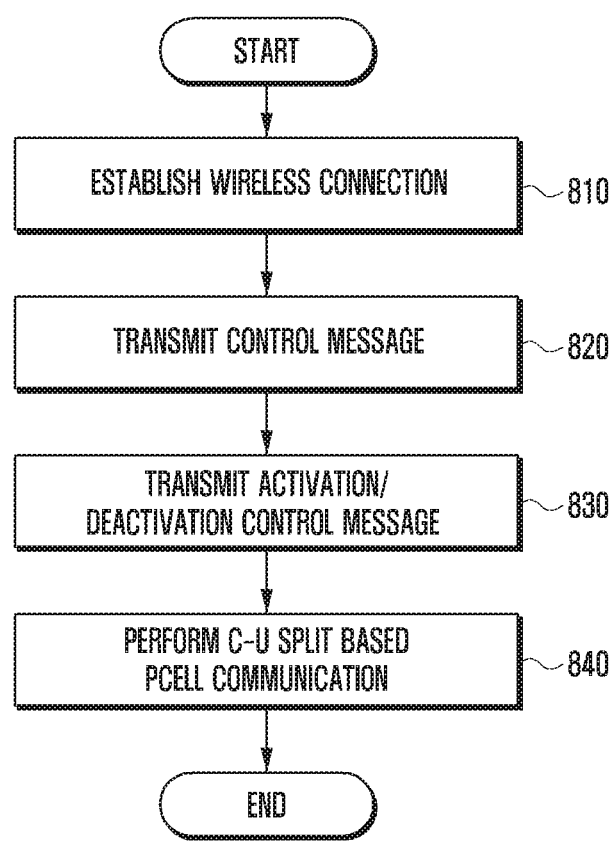
FIG. 8 is a diagram illustrating operations of a macro evolved-node B (eNB) according to the first embodiment of the present invention.

FIG. 8 is a diagram illustrating operations of a macro eNB according to the first embodiment of the present invention. Referring to FIG. 8, a macro cell establishes a wireless connection with a UE in operation 810.

In operation 820, the macro cell transmits a control message to the UE. An RRC signaling may be used for the transmission of the control message. The control information may include information indicating the addition or release of an SCell in association with CA. According to another embodiment of the present invention, the RRC signaling may further include C-U split related control information, but the embodiments may not be limited thereto. The macro cell may transmit a control message associated with whether to add or release an SCell based on measurement information (measurement report) received from the UE. The C-U split related control information may be control information indicating that a macro cell (PCell) operated based on FDD needs to provide a service associated with a control plane and a small cell (SCell) operated based on TDD needs to provide a service associated with only a data plane.

In operation 830, the macro cell transmits an activation/deactivation control message. The activation/deactivation control message may be determined based on the control message transmitted in operation 820. When the control message includes SCell-add control information in operation 820, the macro cell transmits an activation control message to the UE in operation 830. The activation control message may be a message instructing the UE to activate an SCell. When the control message includes SCell-release control information in operation 820, the macro cell transmits a release control message to the UE in operation 830. The release control message is a message instructing the UE to interrupt the activation of an SCell, and to release the SCell in CA.

In operation 840, the macro cell may communicate with the UE based on a C-U split. That is, a control plane may be transmitted/received to/from the UE through an FDD PCell layer of the macro cell. The control plane may include information associated with connection management, mobility management, and the scheduling of the UE. TDD-FDD CA may be operated in a manner of transmitting a PUCCH of a TDD SCell through an FDD PCell Uplink, and preventing the transmission of a PUSCH of a TDD SCell. In this instance, the TDD SCell that performs a CA operation with the macro cell may be operated based on only a downlink data mode, and the coverage of the TDD SCell may be expanded based thereon.

Figure 9:
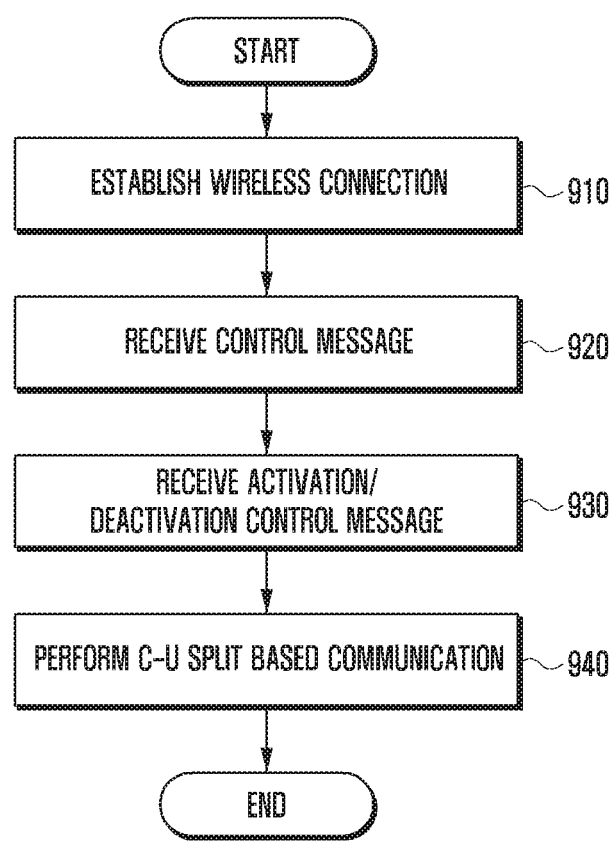
FIG. 9 is a diagram illustrating operations of a UE according to the first embodiment of the present invention.

FIG. 9 is a diagram illustrating operations of a UE according to the first embodiment of the present invention.

Referring to FIG. 9, a UE establishes a wireless connection with a macro cell in operation 910.

In operation 920, the UE receives a control message from the macro cell. An RRC signaling may be used for the reception of the control message. The control information may include information indicating the addition or release of an SCell in association with CA. According to another embodiment of the present invention, the RRC signaling may further include C-U split related control information, but the embodiments may not be limited thereto. The control information that the UE receives may include information indicating whether to add or release an SCell. This may be determined based on a measurement report that the UE transmits to an eNB. The C-U split related control information may be control information indicating that a macro cell (PCell) operated based on FDD needs to provide a service associated with a control plane and a small cell (SCell) operated based on TDD needs to provide a service associated with only a data plane.

Based on the control information received from the macro cell, the UE may determine whether to add or release an SCell, and may set the execution of communication through a C-U split in the case of CA of a macro cell and a small cell.

In operation 930, the UE receives an activation/deactivation control message. The activation/deactivation control message may be determined based on the control message received in operation 920. When the control message includes SCell-add control information in operation 920, the macro cell transmits an activation control message to the UE. When the control message includes SCell-release control information in operation 920, the macro cell transmits a release control message to the UE.

In operation 940, the UE may communicate with the macro cell (FDD-based PCell) and a small cell based on the C-U split. That is, a control plane may be transmitted/received to/from the UE through an FDD PCell layer of the macro cell. The UE may perform communication using TDD-FDD CA so that the UE may receive a PUCCH of a TDD SCell through the FDD PCell layer of the macro cell, and does not receive a PUSCH of the TDD SCell. In this instance, the TDD SCell that performs a CA operation with the macro cell may be operated with the UE based on only a downlink data mode, and the coverage of the TDD SCell may be expanded based thereon.

A second embodiment of the present invention relates to a method and apparatus that supports CA of a macro cell and a small cell, and improves the quality of communication when a network system that supports a C-U split changes a small cell environment. In the second embodiment of the present invention, a macro cell and a small cell may support all cases in which a cell is configured with FDD and FDD, TDD and TDD, FDD and TDD, or TDD and FDD. The second embodiment of the present invention provides a method and apparatus that performs controlling using an indicator so that a macro eNB transmits a user plane when a small cell environment is changed, and prevents the deterioration of the quality of communication due to interruption even in the case in which the small cell environment is changed. The invention associated with a handover and a C-U split, which is provided through the first embodiment, may be applied to the second embodiment, and the descriptions that overlap the first embodiment will be omitted.

Hereinafter, the second embodiments of the present invention will be described with reference to FIGS. 10 to 14.

Figure 10:
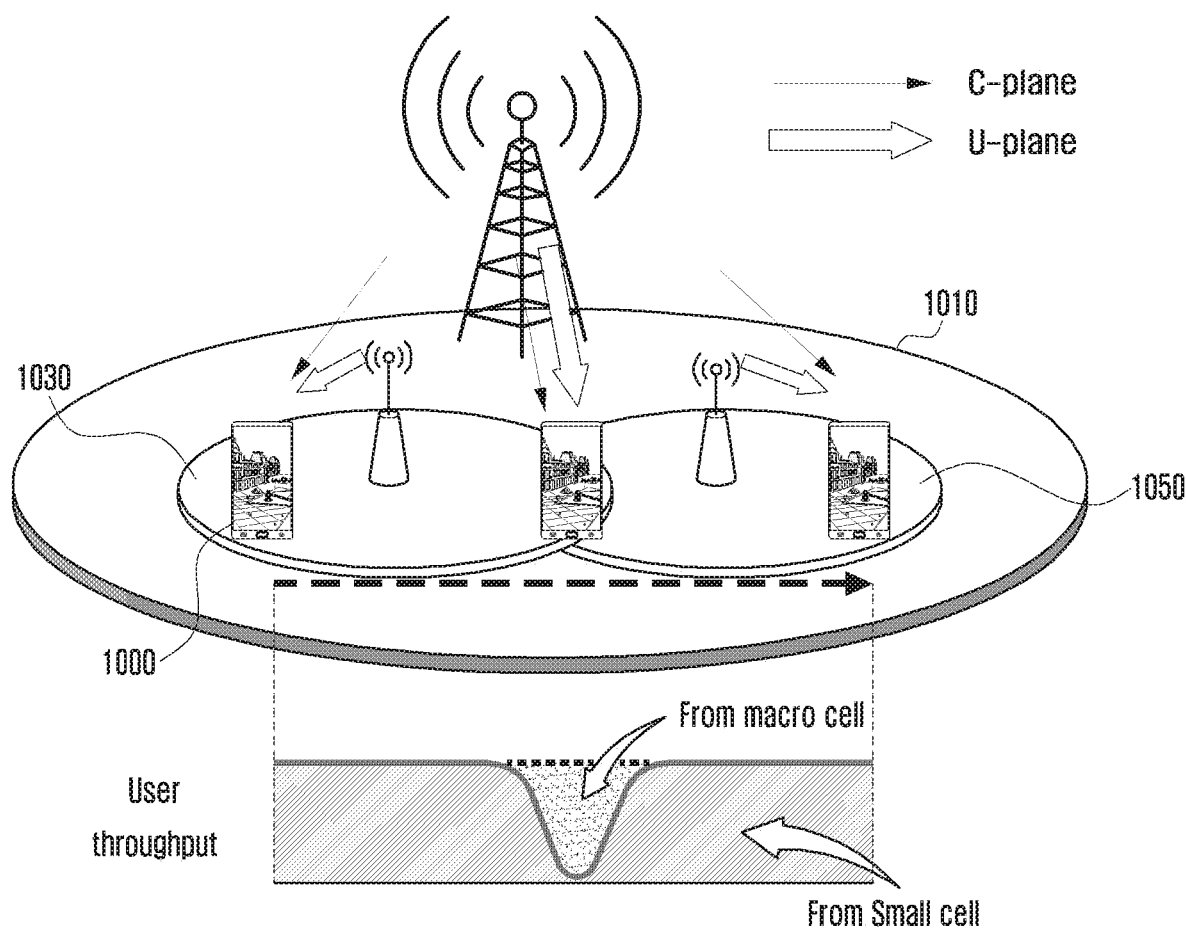
FIG. 10 is a diagram illustrating a problem when a cell environment changes in a CA environment of a macro cell and a small cell.

FIG. 10 is a diagram illustrating a problem when a cell environment changes in a CA environment of a macro cell and a small cell. Referring to FIG. 10, a wireless communication network may include a macro cell 1010 and at least one small cell 1030 and 1050. The network of FIG. 10 assumes the case in which a C-U split is applied under carrier aggregation (CA).

In the case in which a UE 1000 is located in a small cell coverage, when the UE is at a short distance from a small cell eNB, or is located in an area where the channel state of a small cell is good, a radio resource throughput is favorable. However, when the UE moves to a small cell edge and is located at a long distance from the small cell eNB, or when the UE is located in an area where the channel state of the small cell is poor, the radio resource throughput is poor.

Also, in the case of CA of the macro cell and the small cell or dual connectivity, the macro eNB always provides a service of a control plane and a user plane of the UE, and thus, the load is high. Therefore, there is a desire for a method of reducing the load of the macro cell.

Figure 11:
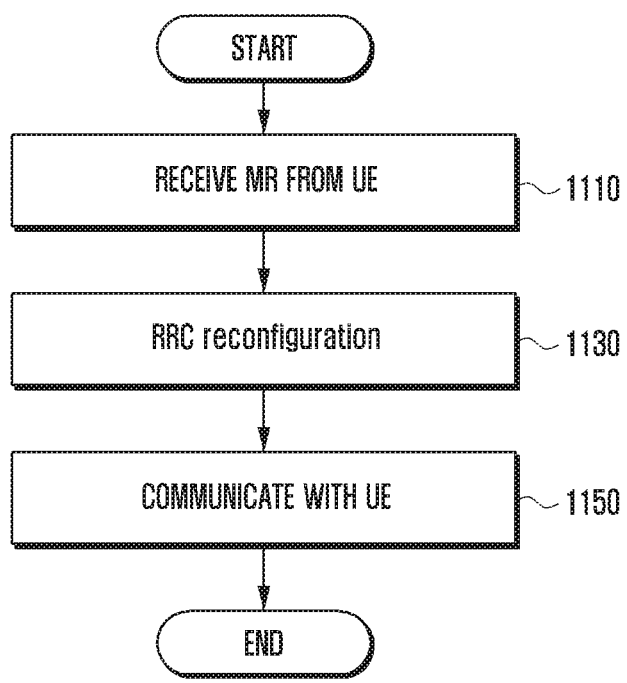
FIG. 11 is a diagram illustrating a problem in a conventional handover environment.
Figure 12:
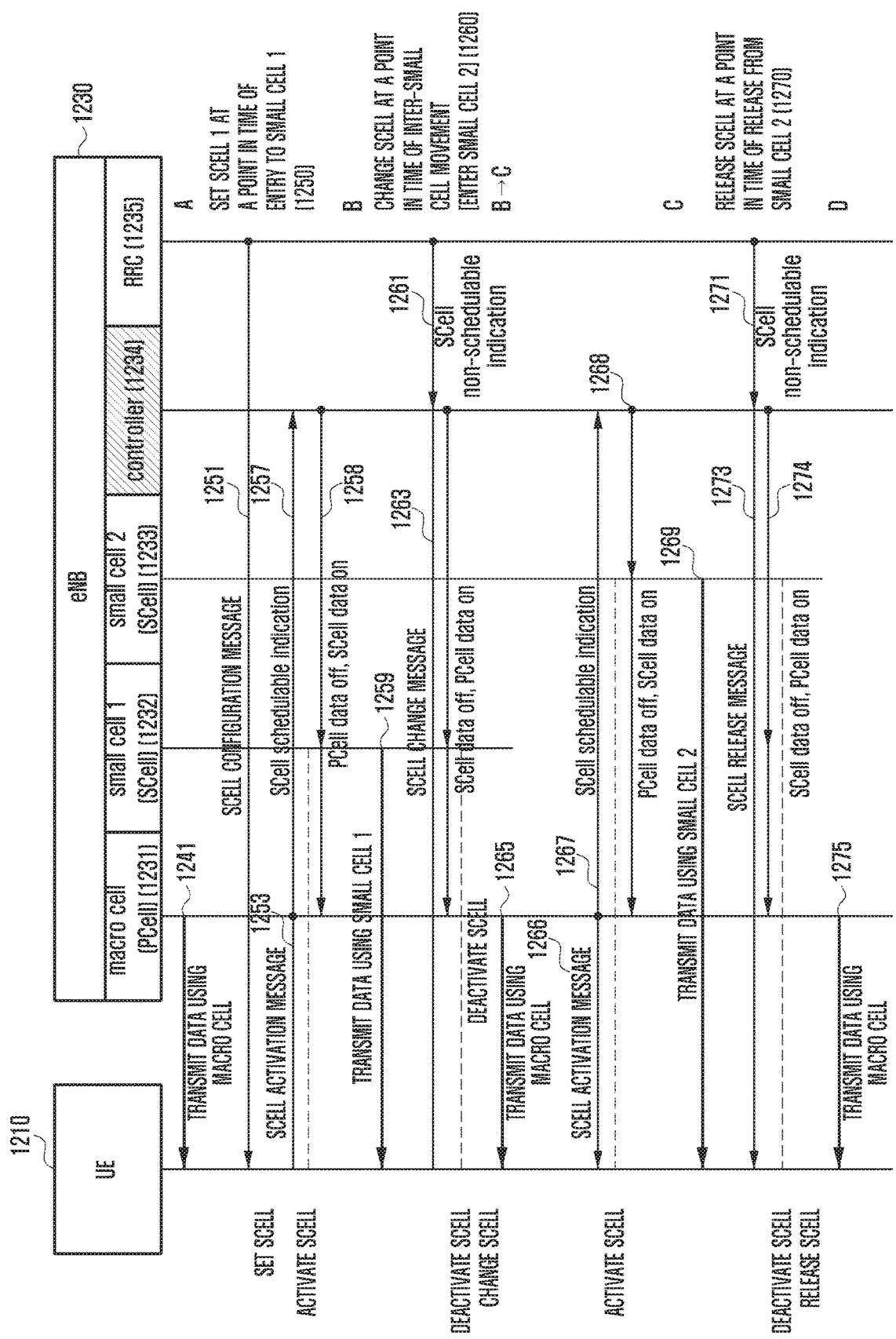
FIG. 12 is a diagram illustrating a network operating method according to a second embodiment of the present invention.

FIG. 11 is a diagram illustrating a problem in a conventional handover environment. Referring to FIG. 12, a UE and an eNB perform communication in the state in which the UE and the eNB have a wireless connection. In operation 1110, the eNB receives a measurement report from the UE. The measurement report is the UE's reporting of a cell measurement result associated with a serving cell and a neighbor cell. The measurement report may use an RRC signaling.

The eNB may determine a handover based on the measurement report received from the UE. When the UE newly enters a small cell, or the UE is out of a small cell and enters a new small cell, an inter-frequency handover may be performed. Also, when the UE moves between small cells, the inter-frequency handover may be performed. During the handover, an interruption may occur so that data transmission is not performed for a period of several milliseconds.

In the second embodiment of the present invention, whether it is the case in which a small cell is incapable of processing data or is incapable of processing data favorably, is determined based on the edge of a small cell, a small cell channel environment, the user plane scheduling capability of a small cell, or the like. In this instance, a macro cell provides a service associated with a user plane. To this end, indication information or an indicator may be used that indicates turning on/off a user plane of the macro cell with respect to the UE, or turning on/off a user plane of the small cell with respect to the UE. Also, through a C-U split, a handover may be prevented from occurring when the UE moves out of a small cell, and a high speed cell switching may be used. Also, through the C-U split, the load of a macro eNB may be alleviated.

FIG. 12 is a diagram illustrating a network operating method according to the second embodiment of the present invention. Referring to FIG. 12, a wireless communication network includes a UE 1210 and an eNB 1230. The eNB 1230 may be a C-RAN eNB. The relationship among the C-RAN eNB, a macro cell, and a small cell may be understood based on FIG. 6. The macro cell and the C-RAN eNB may be interchangeably used. The eNB 1230 may include a macro cell 1231, a small cell 1 1232, a small cell 2 1233, a controller 1234, and an RRC controller 1235. The controller 1234 and the RRC controller 1235 may not always need to operate separately, and may be configured as a single eNB controller including the controller 1234 and the RRC controller 1235. According to a C-U split, a service associated with a control plane may be provided through only a macro eNB. Therefore, in FIG. 12, descriptions will be provided based on an operation of providing a service associated with a user plane.

Operation 1241 corresponds to the case in which the UE is located within the coverage of the macro cell, and is out of the coverage of a small cell. The macro cell 1231 may transmit a user plane (data transmission) to the UE 1210. Also, the UE and the macro cell may perform communication. When the UE and the macro eNB perform communication, the UE measures a wireless environment of a serving cell and a neighbor cell periodically or aperiodically, and transmits a measurement report (MR) to the eNB 1230. The measurement report may use an RRC signaling.

Operation 1250 corresponds to the case in which the UE enters the coverage of the small cell 1 1232 based on the cell measurement result. When the UE 1210 enters the coverage of the small cell 1 1232, the eNB 1230 transmits an SCell configuration message to the UE 1210 in operation 1251. In operation 1253, the macro cell 1231 transmits an SCell activation message to the UE 1210. In operation 1254, the macro cell 1231 transmits, to the controller 1234, indication information indicating that the small cell 1 is capable of performing data scheduling as an SCell.

In operation 1258, the controller enables the SCell to provide a user plane to the UE, based on the indication information. In this instance, the controller may perform setting to enable a PCell to not provide a user plane. That is, when the SCell schedules a user plane for the UE, the controller controls the PCell to not provide a user plane, and thus, the load of the PCell may be reduced.

In operation 1259, the small cell 1 1233 transmits a user plane to the UE 1210. Still, a control plane may be transmitted to the UE through the macro cell. A control channel associated with the user plane transmitted by the small cell may be also provided through the macro cell.

Operation 1260 corresponds to a process of changing an SCell when the UE moves between small cells. When the UE moves out of a small cell, or when the UE moves between cells of which small cell coverages overlap, an SCell change procedure may be performed. When the UE moves between small cells of which small cell coverages do not overlap, a procedure of releasing a small cell where a service is currently received, and adding a new small cell, may be performed. Operation 1260 corresponds to an SCell change process. In each embodiment of the present invention, a process of moving out of an SCell without performing a handover through the C-U split, during the movement out of the small cell, may be referred to as SCell switching. Operation 1260 corresponds to the case in which the UE 1210 moves from the coverage of the small cell 1 1232 to the coverage of the small cell 2 1233.

In operation 1261, when the small cell 1 1232 is incapable of transmitting a user plane, the eNB 1230 transmits, to the controller 1234, SCell non-schedulable indication indicating that the small cell 1 is incapable of scheduling a user plane any longer. In operation 1263, the eNB 1230 transmits, to the UE 1210, a message indicating the change of an SCell, based on the indication information.

In operation 1264, the controller of the eNB 1230 may perform setting to enable the small cell 1 1232 to not transmit a user plane, and in parallel, may perform setting to enable the macro cell 1231 to transmit a user plane. The small cell 1 1232 is deactivated as an SCell and may not transmit a user plane, and the macro cell 1231 may transmit a user plane in operation 1265. As described above, the eNB 1230 is aware of a cell change timing, and thus, when a scheduling probability of an SCell is changed, the eNB 1230 enables the macro cell 1231 to transmit a user plane, and thus, may prevent the occurrence of a data hole.

The macro cell transmits an SCell activation message to the UE in operation 1266, and the macro cell transmits, to the controller of the eNB 1230, indication information indicating that the small cell 2 1233 is capable of scheduling a user plane in operation 1267. In operation 1268, the eNB 1230 may perform setting to enable the small cell 2 1233 to transmit a user plane to the UE 1210, based on the indication information. Also, the eNB 1230 may perform setting to enable the macro cell 1231 to not transmit a user plane. In operation 1269, the small cell 2 1233 transmits a user plane to the UE.

Operation 1270 corresponds to a process of releasing an SCell when the UE moves out of the coverage of the small cell 2 1233 during the CA of the macro cell 1231 and the small cell 1233.

In operation 1271, when the small cell 2 1232 is incapable of transmitting a user plane, the eNB 1230 transmits, to the controller 1234, SCell non-schedulable indication indicating that the small cell 2 is incapable of scheduling a user plane any longer. In operation 1273, the eNB 1230 transmits, to the UE 1210, a message indicating the release of an SCell, based on the indication information.

In operation 1274, the controller of the eNB 1230 may perform setting to enable the small cell 2 1233 to not transmit a user plane, and in parallel, may perform setting to enable the macro cell 1231 to transmit a user plane. The small cell 2 1233 is deactivated as an SCell, and may not transmit a user plane. In operation 1275, the macro cell 1231 transmits a user plane. As described above, the eNB 1230 is aware of a cell release timing, and thus, when an SCell is incapable of scheduling a user plane, the eNB 1230 enables the macro cell 1231 to transmit a user plane, and thus, may prevent the occurrence of a data hole.

When the UE 1210 moves to the coverage of another small cell that is included in the coverage of the macro cell 1231 after operation 1270, the operation may proceed with an SCell add operation, which has been described in operation 1250.

Figure 13:
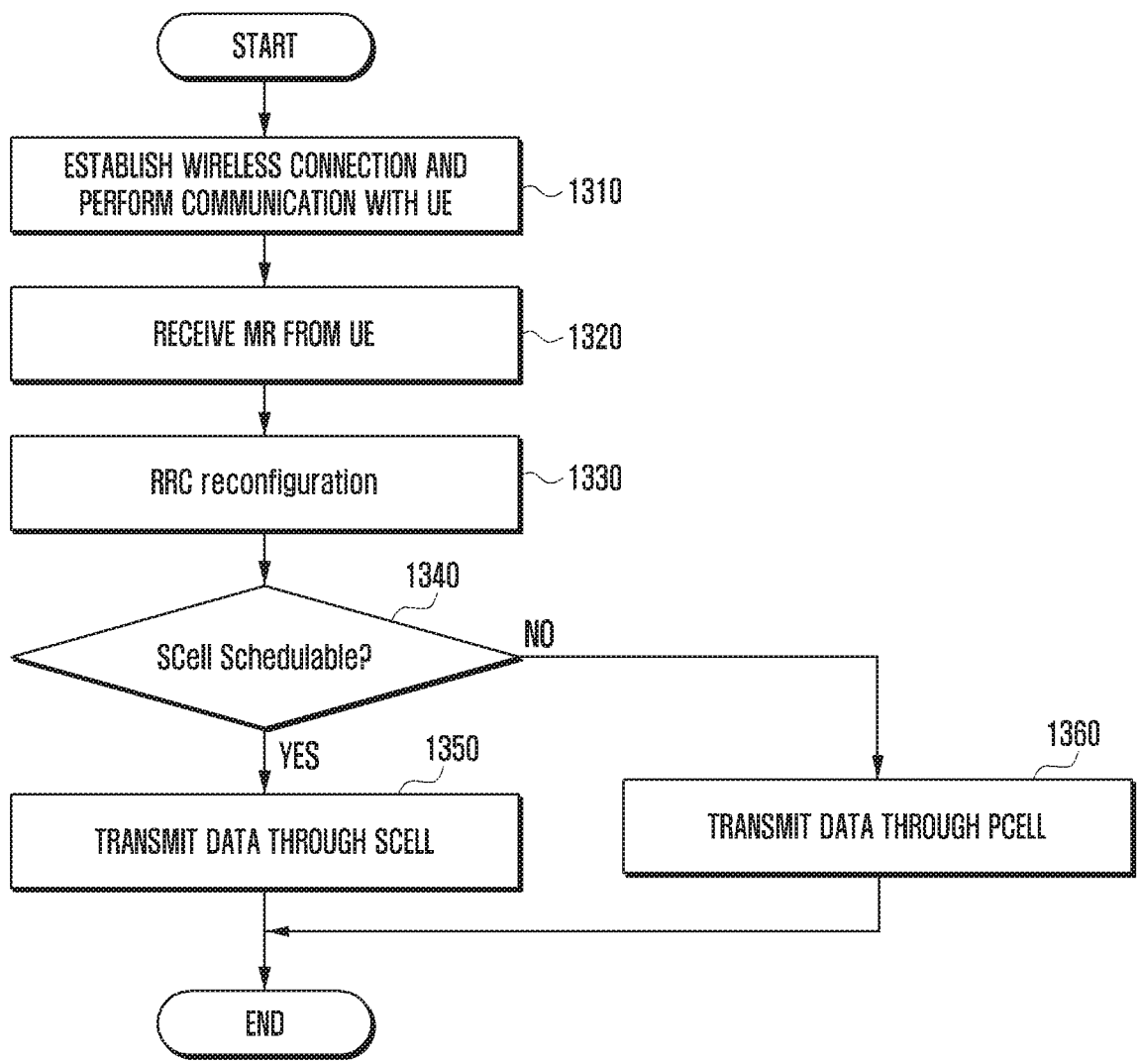
FIG. 13 is a diagram illustrating operations of a macro eNB according to the second embodiment of the present invention.

FIG. 13 is a diagram illustrating operations of a macro eNB according to the second embodiment of the present invention.

Referring to FIG. 13, a UE and a macro eNB establish a wireless connection and perform wireless communication in operation 1310. In operation 1320, the macro eNB receives a measurement report (MR) from the UE during the wireless communication. When the UE enters, changes, or moves out of a small cell, the macro eNB may receive an SCell related MR.

In operation 1330, the macro eNB performs RRC reconfiguration. The macro eNB transmits an RRC reconfiguration message to the UE. The RRC reconfiguration may be determined based on the MR received from the UE. The RRC reconfiguration may include the change of an SCell, the addition of an SCell, and the release of an SCell. Based on the RRC reconfiguration, a message that requests the addition, release, change of an SCell may be transmitted to the UE.

In operation 1340, the macro eNB determines whether an SCell, which is the target of RRC reconfiguration, is capable of scheduling a user plane, that is, data. Determining whether the SCell is capable of scheduling a user plane is different from transmitting scheduling control information used for the SCell to transmit a user plane, but determining whether the SCell is in a cell environment that is capable of transmitting a user plane. In an SCell activation state, scheduling is possible. In an SCell add state, the activation of an SCell is possible. In an SCell deactivation state, scheduling is impossible. An SCell release state always corresponds to an SCell deactivation state, and scheduling is impossible. Even in the SCell add state, when an SCell channel state is poor, an SCell may be deactivated. In the case of changing an SCell, a release-and-add process is performed, and thus, an SCell deactivation state may happen. Based on whether an SCell is capable of performing scheduling, it is determined whether a PCell or an SCell is to be used for transmitting a user plane. Whether an SCell is capable of scheduling a user plane may be also determined based on scheduling information of a scheduler. For example, although it is in an SCell add state and activation state, when it is determined that the channel state of an SCell is poor based on the scheduling information of the SCell, it is determined that user plane scheduling through the SCell is impossible.

When the SCell is capable of scheduling a user plane, the operation proceeds with operation 1350, and data may be transmitted through an SCell. In this instance, a user plane transmission through the PCell may be interrupted.

The case in which the SCell is capable of scheduling a user plane may be the case in which the UE moves to the coverage of a new SCell through the addition of an SCell or the change of an SCell. When the SCell is incapable of scheduling a user plane, the operation proceeds with operation 1360, and data may be transmitted through the PCell. The case in which the SCell is incapable of scheduling a user plane may be the case of the release of an SCell or a process of movement from a serving SCell to another SCell during the process of changing an SCell. The macro eNB is aware of the scheduling state of an SCell in advance, and thus, when the SCell is incapable of scheduling a user plane, the macro eNB may enable the PCell to transmit a user plane and may perform communication without the disconnection of data.

When the UE and the eNB are continuously operated, each operation may be repetitively performed.

Figure 14:
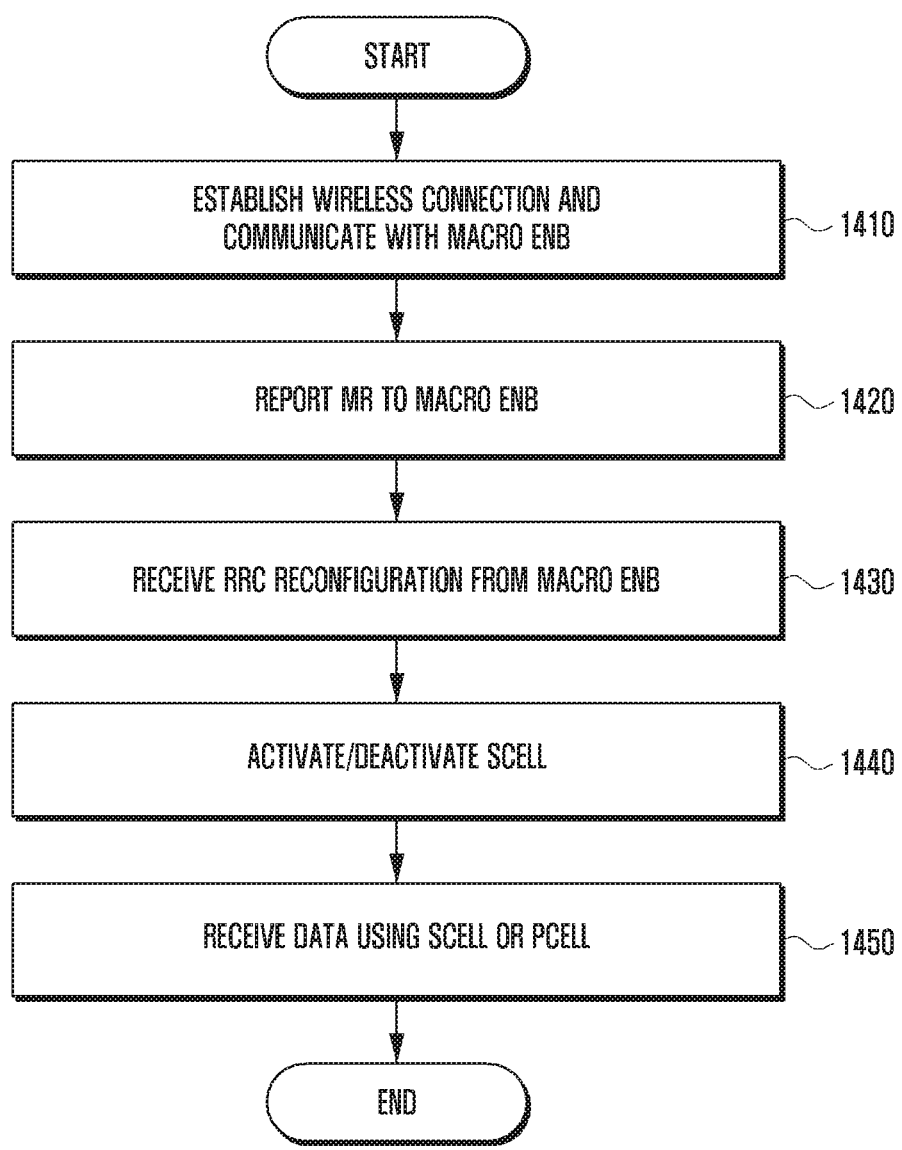
FIG. 14 is a diagram illustrating operations of a UE according to the second embodiment of the present invention.

FIG. 14 is a diagram illustrating operations of a UE according to the second embodiment of the present invention.

Referring to FIG. 14, a UE and a macro eNB establish a wireless connection and perform wireless communication in operation 1410. In operation 1420, the UE transmits a measurement report (MR) to the macro eNB during the wireless communication, periodically or aperiodically. The macro eNB transmits an RRC reconfiguration message based on the measurement report transmitted by the UE.

In operation 1430, the UE receives the RRC reconfiguration message from the macro eNB. The RRC reconfiguration may be determined based on the MR received from the UE. The RRC reconfiguration may include the change of an SCell (SCell change), the addition of an SCell (SCell add), and the release of an SCell (SCell release).

In operation 1440, the UE may activate or deactivate an SCell based on the RRC reconfiguration message. In the case of the addition of an SCell, the UE may activate an SCell. In the case of the release of an SCell, the UE may deactivate an SCell. In the case of the change of an SCell, the UE may activate an SCell after deactivating an SCell.

In operation 1450, the UE receives a user plane from a macro eNB or a small eNB. When the UE activates the SCell and is connected to the small eNB in operation 1440, the UE receives a user plane from the small eNB. In this instance, a user plane transmission through a PCell may be interrupted.

When the UE deactivates the SCell in operation 1440, the UE may not be connected to the small eNB, and may receive a control plane and a user plane from the PCell. When the UE changes the SCell in operation 1440, the UE deactivates the SCell, and in parallel, receives a user plane from the PCell. When the SCell is changed into a new SCell, and the UE is able to receive a user plane from the new SCell, the UE may receive a user plane from the new SCell. In this instance, a user plane reception through the PCell may be interrupted.

It is apparent that the first embodiment is applied to the second embodiment, and the second embodiment is applied to the first embodiment. When the first embodiment is applied to the second embodiment, each cell may not need to be specified to an FDD/TDD band. When the second embodiment is applied to the first embodiment, a macro cell is set to an FDD primary cell, and a small cell may be set to a TDD secondary cell.

Figure 15:
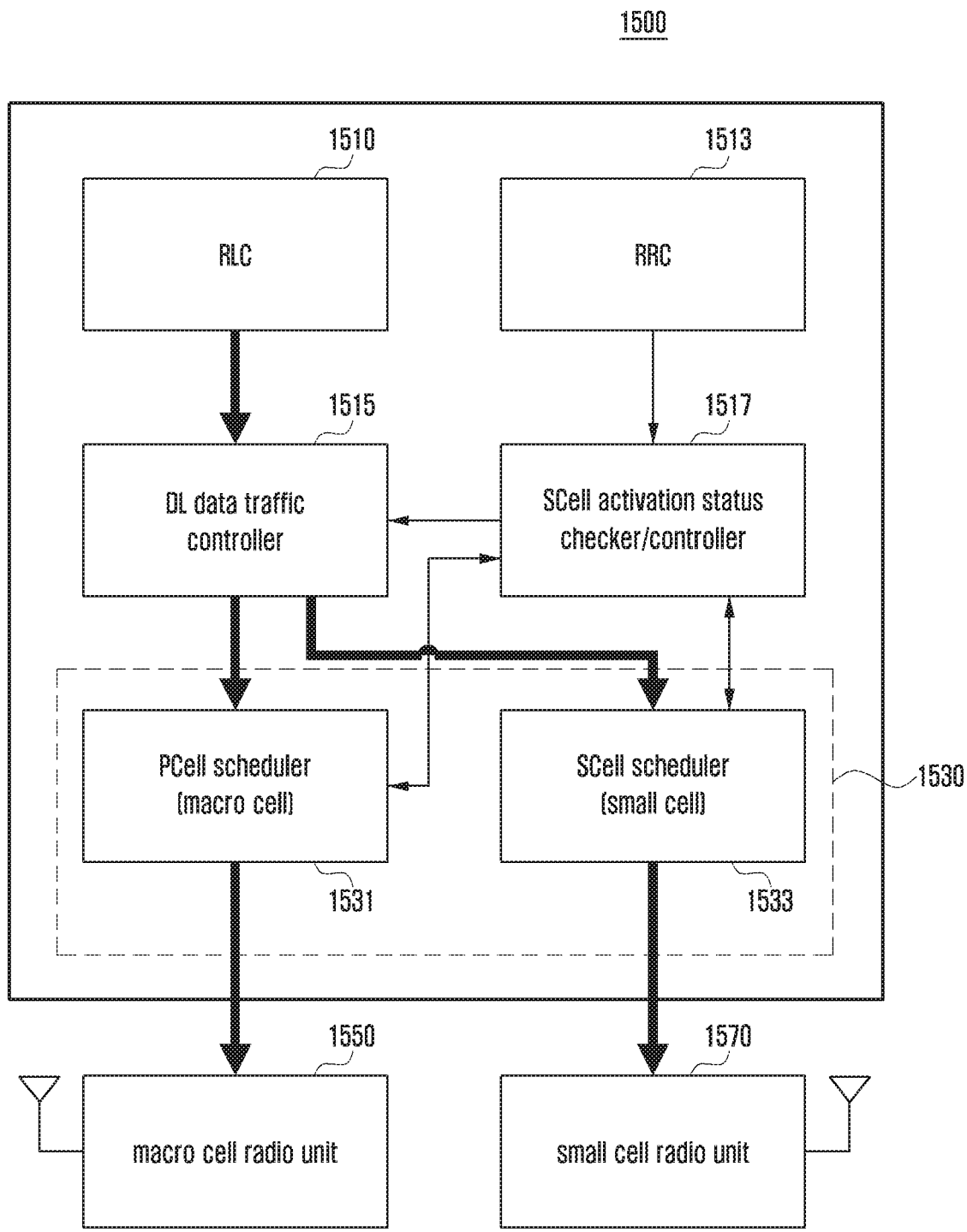
FIG. 15 is a diagram illustrating a configuration of C-RAN eNB according to an embodiment of the present invention.

FIG. 15 is a diagram illustrating a configuration of C-RAN eNB according to an embodiment of the present invention.

A C-RAN eNB 1500 is an eNB that supports CA of a macro cell and a small cell, and is capable of performing coordination in real time since a scheduler for the macro cell and a scheduler for the small cell are included in the single eNB.

The C-RAN eNB 1500 may include a controller that controls general functions of the eNB, a macro cell radio unit 1550, and a small cell radio unit 1570. The small cell radio unit 1570 may be a plurality of small cell radio units.

The macro cell radio unit 1550 may be an interface through which a macro cell transmits/receives radio resources to/from a UE. A control plane and a user plane may be transmitted to the UE through the macro cell radio unit 1550. The small cell radio unit 1570 may be an interface through which a small cell transmits/receives radio resources to/from the UE. A user plane may be transmitted to the UE through the small cell radio unit 1570.

The controller may control general operations of the eNB. The controller may include an RLC 1510, an RRC 1513, a down traffic controller 1515, an SCell activation status controller 1517, and a scheduler 1530. The scheduler 1530 may include a PCell scheduler 1531 and an SCell scheduler 1533.

The down traffic controller 1515 may perform controlling to transmit downlink data to only an SCell when the SCell is activated, and to not transmit data to the macro cell. When the SCell is deactivated, the down traffic controller 1515 may perform controlling to transmit DL data to the PCell, so that the data transmission is prevented from being disconnected when a scheduling environment of the small cell is changed.

The SCell activation status controller 1517 determines the current activation state of the SCell, and informs the down traffic controller 1515 of the same. The SCell activation status controller 1517 may manage the state of the SCell based on a PCell/SCell scheduler or RRC information. In this instance, an SCell activation indicator may be used. For example, an SCell activation/deactivation message may be transmitted as an indicator. Also, it may be set that whether an SCell is capable of performing scheduling is determined when a predetermined period of time elapses after the transmission of an RRC message that requests the addition, release, or change of an SCell.

Although the configuration of the eNB has been described by distinguishing the same into blocks for ease of descriptions, the present invention may not be limited thereto. Also, it is apparent that the eNB is capable of implementing the embodiments of the present invention that have been described with reference to FIGS. 1 to 14.

Figure 16:
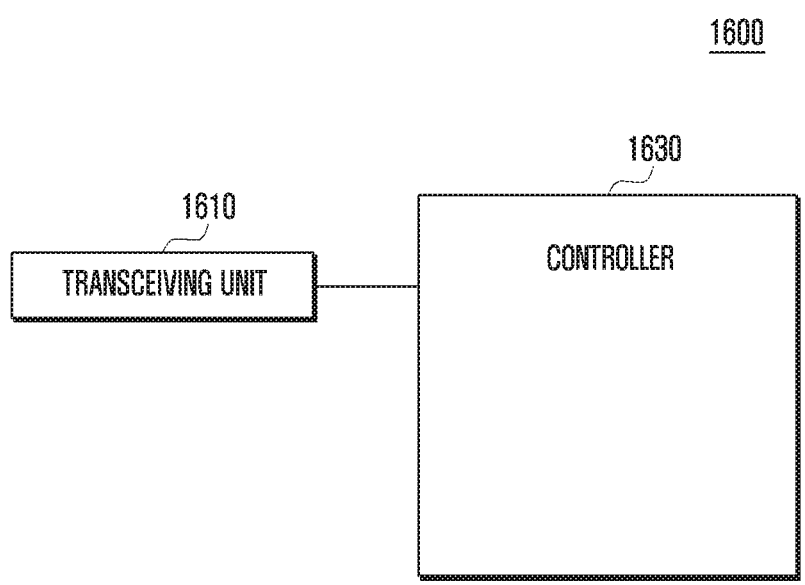
FIG. 16 is a diagram illustrating a configuration of a macro eNB according to an embodiment of the present invention.

FIG. 16 is a diagram illustrating a configuration of a macro eNB according to an embodiment of the present invention.

Referring to FIG. 16, a macro eNB 1600 includes: a transceiving unit 1610 that includes a wired interface and a wireless interface; and a controller 1630 that controls general operations of a macro eNB. The transceiving unit 1610 may perform communication with at least one network node.

According to an embodiment of the present invention, controlling is performed so that a macro cell performs FDD communication; the small cell performs TDD communication; control information is generated that prevent a handover from happening when a UE moves between small cells in the macro cell; and the control information is transmitted to the UE.

In this instance, the control information may be used to set the UE to receive a control plane from the macro cell when the UE moves between small cells. Also, the control information may be used to set the UE to receive only a user plane from the small cell, and to set the UE to receive, from the macro cell, a control plane associated with the macro cell and a control plane associated with the small cell.

Also, the controller 1630 may perform controlling to: receive measurement information associated with the small cell (secondary cell (SCell)) from the UE, and determine the transmission of a user plane from the macro cell, based on the measurement information. The controller 1630 may perform controlling to interrupt the macro cell's transmission of a user plane when the small cell is in an activation state in the UE, and may control the macro cell to transmit a user plane when the small cell is in a deactivation state in the UE.

Also, when the UE changes an SCell between the small cells, the controller 1630 may perform controlling to enable the macro cell to transmit a user plane during an interval between an SCell deactivation time and an SCell activation time for cell change.

Also, when a user plane throughput of the small cell with respect to the UE is less than, or equal to, a predetermined threshold value, the controller 1630 may perform controlling to enable the macro cell to transmit a user plane.

Also, the controller 1630 may perform controlling to: enable the macro cell to perform FDD communication; enable the small cell to perform TDD communication; generate control information for performing setting to prevent a handover from occurring when the UE moves between small cells in the macro cell; separate a control plane and a user plane into the macro cell and the small cell; and determine whether to perform the macro cell's user plane transmission based on the state information of the small cell.

Although the configuration of the macro eNB has been described by distinguishing the same into blocks for ease of descriptions, the present invention may not be limited thereto. Also, it is apparent that the macro eNB is capable of implementing the embodiments of the present invention that have been described with reference to FIGS. 1 to 14.

Figure 17:
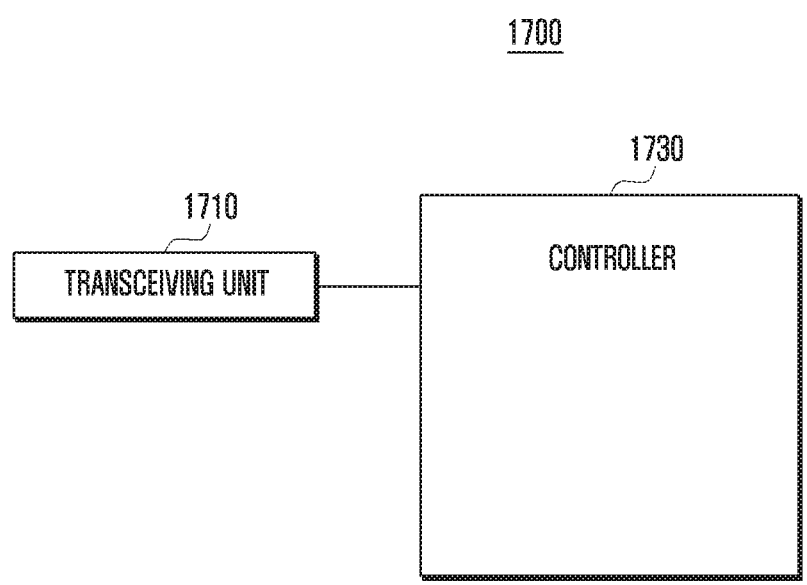
FIG. 17 is a diagram illustrating a configuration of a UE according to an embodiment of the present invention.

FIG. 17 is a diagram illustrating a configuration of a UE according to an embodiment of the present invention.

Referring to FIG. 17, a UE 1700 includes: a transceiving unit 1710 that communicates with at least one network node; and a controller 1730 that controls general operations of the UE 1700.

The controller 1730 may perform setting to receive control information from the macro cell that is set to an FDD mode, and to prevent a handover from happening when the UE moves between small cells that are set to TDD.

In this instance, the control information may be used to set the UE to receive a control plane from the macro cell when the UE moves between small cells. Also, the control information may be used to set the UE to receive only a user plane from the small cell, and to set the UE to receive, from the macro cell, a control plane associated with the macro cell and a control plane associated with the small cell.

Also, the controller 1730 may perform controlling to: transmit small cell (secondary cell (SCell)) related measurement information to a macro cell (primary cell (PCell)); receive an SCell configuration message from the macro cell based on the measurement information; and receive a user plane from the small cell as opposed to receiving a user plane from the macro cell when the small cell is in an SCell activation state.

Also, when the UE changes an SCell between the small cells, the controller 1730 may perform controlling to receive a user plane from the macro cell during an interval between an SCell deactivation time and an SCell activation time for cell change.

Also, when a user plane throughput of the small cell with respect to the UE is less than, or equal to, a predetermined threshold value, the controller 1730 may perform controlling to receive a user plane from the macro cell.

Also, in the case of the communication with the macro cell including at least one small cell, the controller 1730 may perform controlling to: receive control information for performing setting to prevent a handover from happening when the UE moves between the small cells which are set to a TDD mode; separate a control plane and a user plane into the macro cell and the small cell based on the control information; and receive a control plane or a user plane from the macro eNB. In this instance, the reception of a user plane from the macro eNB may be determined based on SCell activation state information associated with the small cell.

Although the configuration of the UE has been described by distinguishing the same into blocks for ease of descriptions, the present invention may not be limited thereto. Also, it is apparent that the UE is capable of implementing the embodiments of the present invention that have been described with reference to FIGS. 1 to 14.

The embodiments disclosed in the present specifications and drawings are provided merely to readily describe and to help a thorough understanding of the present invention but are not intended to limit the scope of the present invention. Therefore, it should be construed that, in addition to the embodiments disclosed herein, all modifications and changes or modified and changed forms derived from the technical idea of the present invention fall within the scope of the present invention.

The invention claimed is:

1. A method performed by a first base station providing a macro cell operated as a frequency division duplex (FDD) communication with a user equipment (UE), wherein a coverage of the macro cell includes at least one small cell provided by at least one second base station, and wherein the at least one small cell is operated as a time division duplex (TDD) communication with the UE, the method comprising:

transmitting, to a UE, first control information for a control plane for indicating an addition of a first small cell of the at least one small cell included in the coverage of the macro cell and for indicating an activation of the first small cell;

identifying whether the UE is within a coverage of the first small cell;

as a result of identifying that the UE is within the coverage of the first small cell, transmitting data for the control plane to the UE while data for a user plane is wirelessly transmitted to the UE via a second user plane of the first small cell only from one of the at least one second base station providing the first small cell and data for the user plane is not wirelessly transmitted to the UE via a first user plane of the macro cell from the first base station providing the macro cell;

generating second control information for the control plane for indicating to release the first small cell based on measurement information received from the UE;

transmitting the second control information to the UE; and transmitting data for the user plane to the UE in response to the second control information being transmitted to the UE, wherein transmitting data, via the first user plane, is deactivated, based on identifying that the UE is within the coverage of the first small cell and the data for the user plane is transmitted to the UE via the second user plane.

2. The method of claim 1, further comprising:

transmitting, data via the first user plane, based on identifying that the UE, previously located within the coverage of the first small cell, is moved outside of the first small cell included in the coverage of the macro cell and remains outside other small cells included in the macro cell.

3. The method of claim 1, further comprising:

setting, based on the second control information, the UE to receive the control plane data from a macro cell plane, while the UE moves from the first small cell to a second small cell.

4. The method of claim 1, further comprising:

receiving, from the UE, a measurement report for reporting a cell measurement result associated with a serving cell and a neighbor cell.

5. A first base station providing a macro cell operated as a frequency division duplex (FDD) communication with a user equipment (UE), wherein a coverage of the macro cell includes at least one small cell provided by at least one second base station, and wherein the at least one small cell is operated as a time division duplex (TDD) communication with the UE, the first base station comprising:

a transceiver; and a controller operable to:

control the transceiver to transmit, to a UE, first control information for a control plane for indicating an addition of a first small cell of the at least one small cell included in the coverage of the macro cell and for indicating an activation of the first small cell, identify whether the UE is within a coverage of the first small cell, as a result of identifying that the UE is within the coverage of the first small cell, control the transceiver to transmit data for the control plane to the UE while data for a user plane is wirelessly transmitted to the UE via a second user plane of the first small cell only from one of the at least one second base station providing the first small cell and data for the user plane is not wirelessly transmitted to the UE via a first user plane of the macro cell from the first base station providing the macro cell, generate second control information for the control plane for indicating to release the first small cell based on measurement information received from the UE, control the transceiver to transmit the second control information to the UE, and control the transceiver to transmit data for the user plane to the UE in response to the second control information being transmitted to the UE, wherein transmitting data, via the first user plane, is deactivated, based on identifying that the UE is within the coverage of the first small cell and the data for the user plane is transmitted to the UE via the second user plane.

6. The first base station of claim 5, further comprising:
transmitting, data via the first user plane, based on identifying that the UE, previously located within the coverage of the first small cell, is moved outside of the first small cell included in the coverage of the macro cell and remains outside other small cells included in the macro cell.

7. The first base station of claim 5,
wherein the controller is further operable to:
set, based on the second control information, the UE to receive the control plane data from a macro cell plane, while the UE moves from the first small cell to a second small cell.

8. The first base station of claim 5, wherein the controller is further operable to:
control the transceiver to receive, from the UE, a measurement report for reporting a cell measurement result associated with a serving cell and a neighbor cell.

9. A method performed by a user equipment (UE) in communication with a first base station providing a macro cell operated as a frequency division duplex (FDD), wherein a coverage of the macro cell includes at least one small cell provided by at least one second base station, and wherein the at least one small cell is operated as a time division duplex (TDD) communication with the UE, the method comprising:

receiving, from a first base station, first control information for a control plane for indicating an addition of a first small cell of the at least one small cell included in the coverage of the macro cell and for indicating an activation of the first small cell;

as a result of identifying that the UE is within a coverage of the first small cell, receiving, from the first base station, data for the control plane to the UE while data for a user plane is wirelessly transmitted to the UE via a second user plane of the first small cell only from one of the at least one second base station providing the first small cell and data for the user plane is not wirelessly transmitted to the UE via a first user plane of the macro cell from the first base station providing the macro cell;

receiving, from the first base station, second control information for the control plane for indicating to release the first small cell based on measurement information received from the UE; and receiving, from the first base station, data for the user plane in response to the second control information being received from the first base station, wherein receiving data, via the first user plane, is deactivated, based on identifying that the UE is within the coverage of the first small cell and the data for the user plane is transmitted to the UE via the second user plane.

10. The method of claim 9, further comprising:
receiving, data via the first user plane, based on identifying that the UE, previously located within the coverage of the first small cell, is moved outside of the first small cell included in the coverage of the macro cell and remains outside other small cells included in the macro cell.

11. The method of claim 9, wherein that the UE receives the control plane data from a macro cell plane while the UE moves from the first small cell to a second small cell is set, based on the second control information.

12. The method of claim 9, further comprising:
transmitting, to the first base station, a measurement report for reporting a cell measurement result associated with a serving cell and a neighbor cell.

13. A user equipment (UE) in communication with a first base station providing a macro cell operated as a frequency division duplex (FDD), wherein a coverage of the macro cell includes at least one small cell provided by at least one second base station, and wherein the at least one small cell is operated as a time division duplex (TDD) communication with the UE, the UE comprising:

a transceiver; and
a controller operable to control the transceiver to:
receive, from a first base station, first control information for a control plane for indicating an addition of a first small cell of the at least one small cell included in the coverage of the macro cell and for indicating an activation of the first small cell, as a result of identifying that the UE is within a coverage of the first small cell, receive, from the first base station, data for the control plane to the UE while data for a user plane is wirelessly transmitted to the UE via a second user plane of the first small cell only from one of the at least one second base station providing the first small cell and data for the user plane is not wirelessly transmitted to the UE via a first user plane of the macro cell from the first base station providing the macro cell, receive, from the first base station, second control information for the control plane for indicating to release the first small cell based on measurement information received from the UE, and receive, from the first base station, data for the user plane in response to the second control information being received from the first base station, wherein receiving data, via the first user plane, is deactivated, based on identifying that the UE is within the coverage of the first small cell and the data for the user plane is transmitted to the UE via the second user plane.

14. The UE of claim 13, further comprising:
receiving, data via the first user plane, based on identifying that the UE, previously located within the coverage of the first small cell, is moved outside of the first small cell included in the coverage of the macro cell and remains outside other small cells included in the macro cell.

15. The UE of claim 13,
wherein that the UE to receive the control plane data from a macro cell plane while the UE moves from the first small cell to a second small cell is set, based on the second control information.

16. The UE of claim 13, wherein the controller is further operable to control the transceiver to transmit, to the first base station, a measurement report for reporting a cell measurement result associated with a serving cell and a neighbor cell.

17. A first base station providing a macro cell operated as a frequency division duplex (FDD) communication with a user equipment (UE), wherein a coverage of the macro cell includes at least one small cell provided by at least one second base station, and wherein the at least one small cell is operated as a time division duplex (TDD) communication with the UE, the first base station comprising:

a transceiver; and a controller operable to:

control the transceiver to transmit, to a UE, first control information for a control plane for indicating an addition of a first small cell of the at least one small cell included in the coverage of the macro cell and for indicating an activation of the first small cell, identify whether the UE is within a coverage of the first small cell, as a result of identifying that the UE is within the coverage of the first small cell, control the transceiver to transmit data for the control plane to the UE while data for a user plane is wirelessly transmitted to the UE via a second user plane of the first small cell only from one of the at least one second base station providing the first small cell and data for the user plane is not wirelessly transmitted to the UE via a first user plane of the macro cell from the first base station providing the macro cell, generate second control information for the control plane for indicating to release the first small cell based on measurement information received from the UE, control the transceiver to transmit the second control information to the UE, and control the transceiver to transmit data for the user plane to the UE in response to the second control information being transmitted to the UE, wherein transmitting data, via the first user plane, is deactivated, based on identifying that the UE is within the coverage of the first small cell and the data for the user plane is transmitted to the UE via the second user plane.

* * * * *